United States Patent [19]
Coe et al.

[11] Patent Number: 5,136,497
[45] Date of Patent: Aug. 4, 1992

[54] MATERIAL CONSOLIDATION MODELING AND CONTROL SYSTEM

[75] Inventors: Carlos J. Coe, Falls Church, Va.; Elizabeth A. Godfrey, Silver Spring, Md.; Benjamin L. Henniges; David W. O'Brien, both of Alexandria, Va.; Jeffery E. Payne, Arlington, Va.; Michael F. Ashby, Cambridge, United Kingdom; Nikolaos Aravas, Philadelphia, Pa.; Robert M. McMeeking, Santa Barbara, Calif.; Richard J. Fields, Rockville, Md.; Phillip A. Parrish, Springfield; Hayden N. G. Wadley, Keswick, both of Va.

[73] Assignee: BDM International, Inc., McLean, Va.

[21] Appl. No.: 551,313

[22] Filed: Jul. 12, 1990

[51] Int. Cl.$^5$ .............................................. G05B 13/02
[52] U.S. Cl. ........................................ 364/165; 364/578
[58] Field of Search ...................... 364/149-156, 364/162, 164, 165, 477, 578

[56] References Cited

U.S. PATENT DOCUMENTS

| | | | |
|---|---|---|---|
| 3,758,762 | 9/1973 | Littman et al. | 364/165 |
| 3,989,935 | 11/1976 | Fay | 364/165 |
| 4,038,531 | 7/1977 | Loe, Jr. | 364/165 |
| 4,363,612 | 12/1982 | Walchutter | 425/167 |
| 4,407,013 | 9/1983 | Acara et al. | 364/162 |
| 4,546,810 | 10/1985 | Landolt | 164/37 |
| 4,563,735 | 1/1986 | Hiroi et al. | 364/165 |
| 4,570,229 | 2/1988 | Breen et al. | 364/476 |
| 4,698,745 | 10/1987 | Hiroi et al. | 364/149 |
| 4,721,448 | 1/1988 | Irish et al. | 364/165 |
| 4,817,006 | 3/1989 | Lewis | 364/476 |
| 4,828,007 | 5/1989 | Fisher et al. | 164/37 |
| 4,951,191 | 8/1990 | Hiroi et al. | 364/164 |

OTHER PUBLICATIONS

"Finite Element Simulation of Hot Isostatic Pressing of Metal Powders," Int Abouaf, M. et al., Int. J. Numerical Methods Engineering, vol. 25, 191-212 (1988).
"On the Numerical Integration of a Class of Pressure-Dependent Plasticity Models", Aravas, N., Int. J. Numerical Methods Engineering, vol. 24, pp. 1395-1416 (1987).
HIP 6.0 Background Reading, and User Manual, Engineering Department, Cambridge University, Cambridge, U.S., Ashby, M. (Jan. 1990) (software product).
"Numerical Simulation of Hot Isostatic Pressing of Ceramic Powders", Besson, J. et al., Centre des Materiaux, ENSMP (Publication date uncertain).
"Densification of Iron Compacts with Various Initial Porosities Under Hydrostatic Pressure", Biner et al., Acta Metall., vol. 38, No. 4, pp. 603-610 (1990).
"An Internal Variable Constitutive Model for Hot Working of Metals", Brown et al., Int. J. Plasticity, vol. 5, pp. 95-130 (1989).
"Anayltical Modeling of the Hot Isostatic Pressing Process", Cassenti, UTRC, East Hartford, Connecticut (Jul., 1980).
DEFORM ™, Product of Battelle, Columbus, Ohio (software based simulation system).

(List continued on next page.)

Primary Examiner—Salvatore Gangialosi
Attorney, Agent, or Firm—Dickstein, Shapiro & Morin

[57] ABSTRACT

A process and apparatus for providing simulation and modeling and control which permits user feedback for purposes of implementing design and process optimization for composite or powder compact materials. Control is achieved through a dual feedback and feedforward hierarchical control scheme employing an interactive modeling system for providing the feedforward control data and a PID control loop for the feedback control. Modeling is based upon constitutive equations which form the basis of modeling solutions derived from the micromechanical relationships inherent in the consolidated materials. The system is implemented in an FEM software platform such that a graphics based visualization in three dimensional form can be provided to the user.

18 Claims, 23 Drawing Sheets

OTHER PUBLICATIONS

"A New Yield Function for Compressible P/M Materials", Doraivelu, Int. J. Mechn. Sci., vol. 26, No. 9/10, pp. 527-535 (1984).

"Deformation-Mechanism Maps," Frost & Ashby, excerprts, Pergamon Press, N.Y., 1982 (handbook).

"Continuum Theory of Ductile Rupture by Void Nucleation and Growth: Part 1-Yield Criteria and Flow Rules for Porous Ductile Materials", J. Eng. Matl. Tech 99, 2-15, Gurson, A. (1977).

"HIPNAS TM", Product of KOBE Steel, Ltd., Kobe, Japan (software based simulation system).

"Metal Forming and Finite Element Method", Kobayashi et al., Oxford University Press (1989) (Handbook).

"Theory and Optimization of Hot Isostatic Pressing", PMI, vol. 22, No. 2 (1990), Catev et al.

"Analysis of the Forming Process of Sintered Powder Metals by a Rigid-Plastic Finite Element Method," Mori et al., Int. J. Mech. Sci., vol. 29, No. 4, pp. 229-238 (1987).

"Computer Simulation of Sintering", J. Ross et al., Acta Metall, vol. 30 (1), pp. 203-212 (1982).

"Thermomechanical Deformation of Powder-Based Porous Aluminum, Part I: Evolution of Pore Structure: Part II: Constitutive Model Including Densification Hardening," Wang, Alcoa Laboratories, Alcoa Center, PA., in progress (1990).

"An Objective Time-Integration Procedure for Isotropic Rate-Independent and Rate-Dependent Elastic-Plastic Constitutive Equations," Weber et al., submitted for publication for Int. J. Plasticity, (Jun., 1989) (Weber I).

"Simulation of the Compaction of Powder Components", Weber et al., (Published after 1989) (Weber II).

"Modeling of Densification and Coarsening During Hot Isostatic Pressing", Wlassich et al., TMS Symposium on Intelligent Processing of Materials, Indianapolis, Indiana (Oct., 1989).

"Microstructure and Mechanical Properties of Nickel Alumnide Powders Consolidated by Extrusion and Hot Isostatic Pressing", Wright et al., Idano National Eng. Laboratory, Idaho Falls, ID. (Jan. 1990).

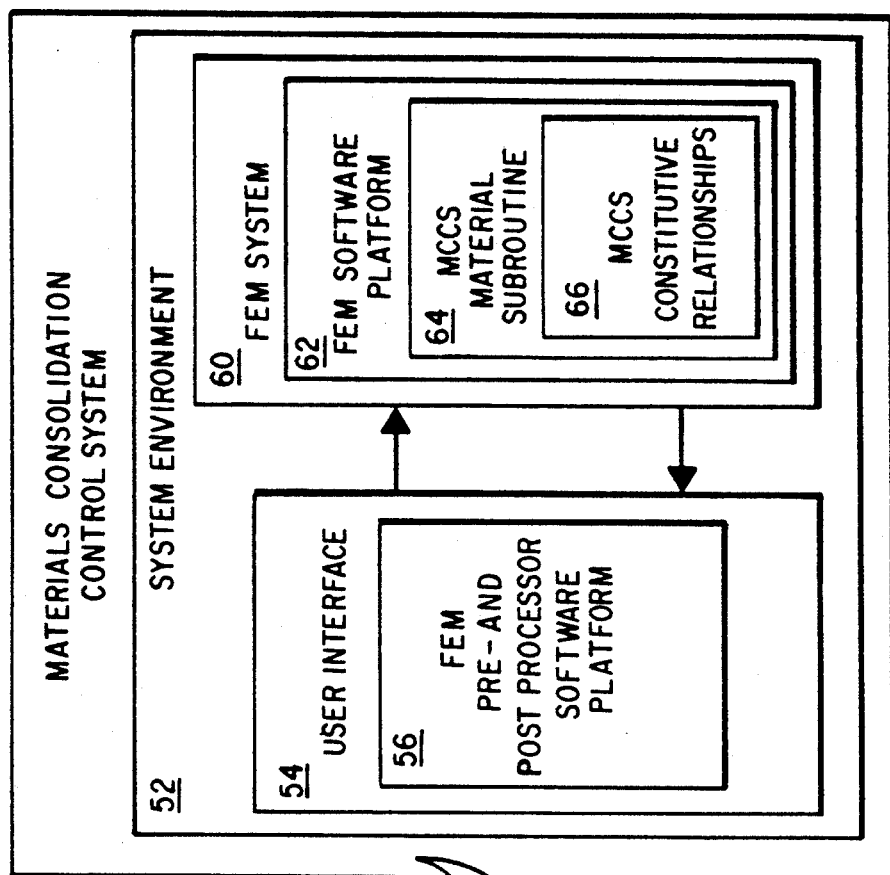
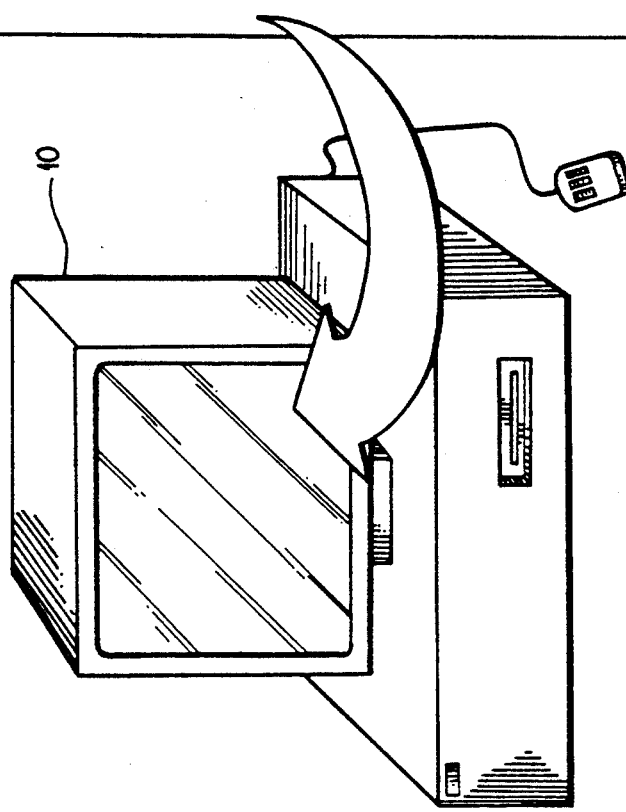
FIG. 2

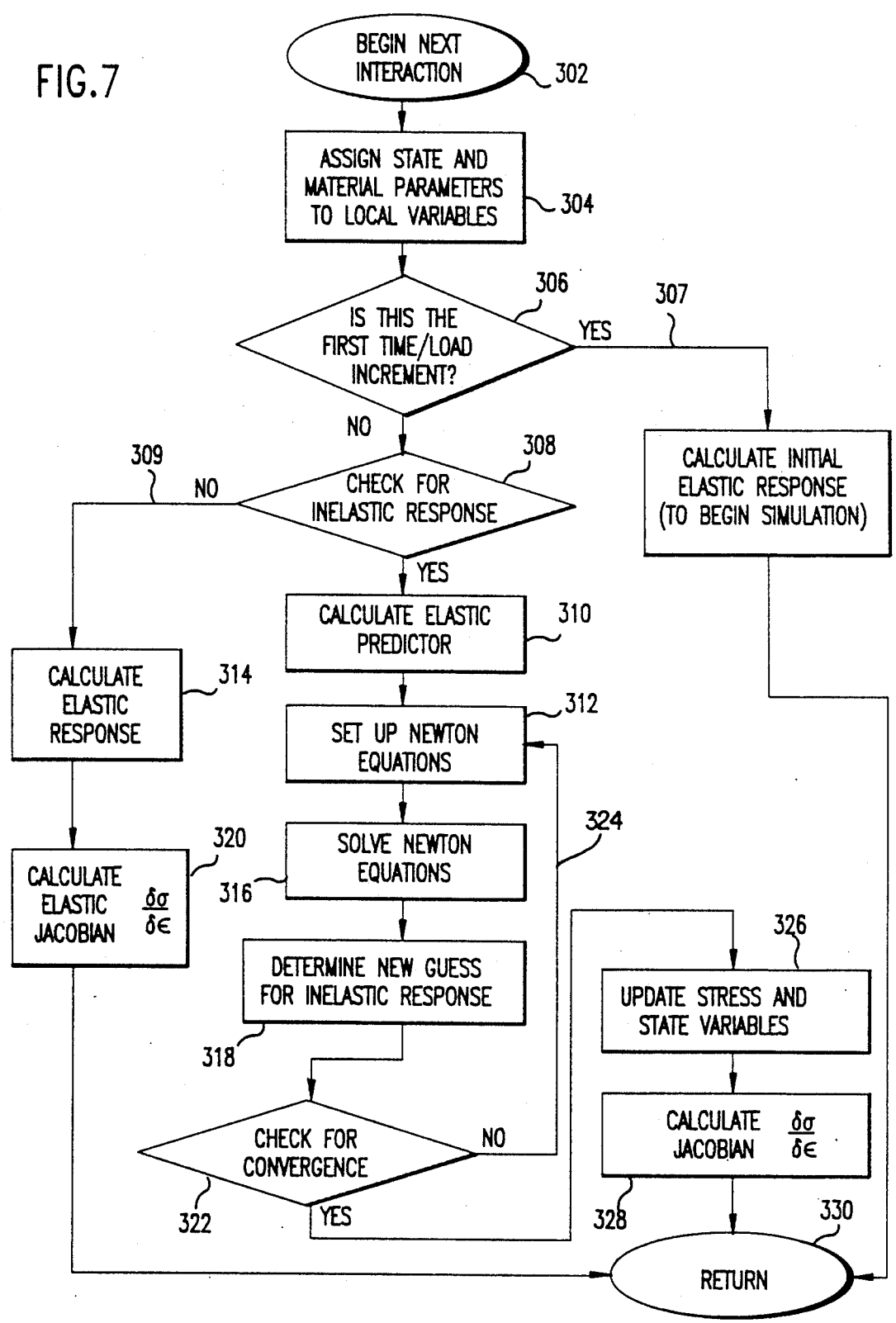

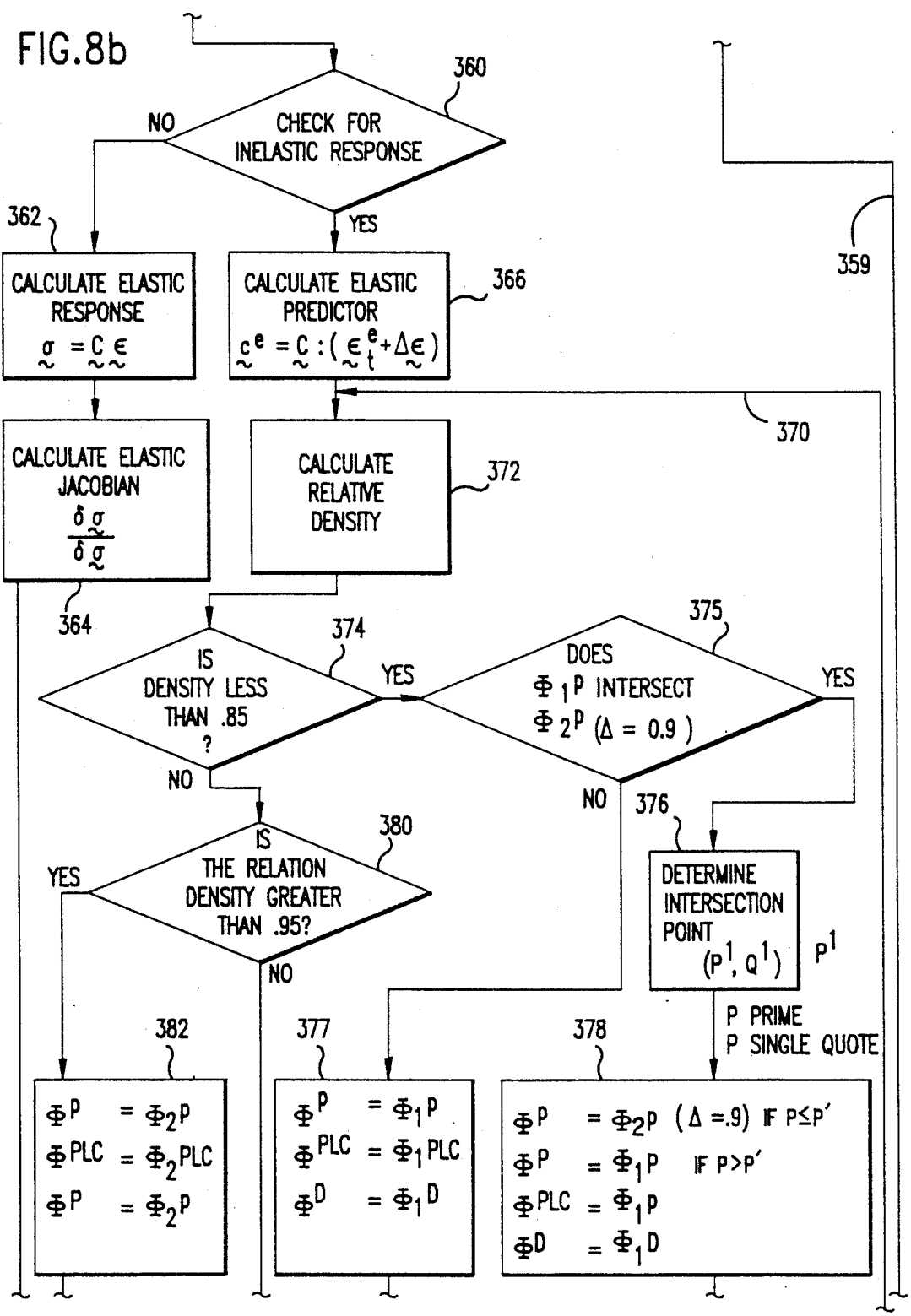

MATERIAL CONSOLIDATION MODELING AND CONTROL SYSTEM

BACKGROUND OF THE INVENTION

This invention relates to a computer software-based design system for controlling a material consolidation process and for modeling the consolidation process and resulting materials through the use of finite element techniques.

It has long been recognized that the presence of porosity in material structures has a deleterious effect on the physical and mechanical integrity of the structures. Thus, the removal of porosity is viewed as an important means for achieving densification and enhancing the properties of the material in question.

Over the past twenty years there has been a considerable emphasis in the use of material consolidation processing techniques in industrial applications. The material consolidation process increases the relative density of the material/structure by reducing the fraction of macrostructural voids in the material. Typically, the materials being consolidated can include any powder compact or composite material such as, for example, metal castings or forgings as ceramic extrusions, plastics or glass. The voids or porosity contained in these material structures typically result from previous processing steps. With society's heightened awareness that it has precious natural resources and the need to economically utilize often expensive raw materials, it has become more desirable to reduce the amount of material required to meet manufacturing needs. Thus, there is a very real need to produce components having near-net shape so that the amount of machining or secondary processing required to complete production of the component may be minimized. This results in significant savings in cost, time, manpower, energy and other natural resources, and will also reduce the amount of waste material generated.

Consolidation is accomplished by exposing the material structure to elevated temperature and pressure for an extended period of time. One such consolidation process is commonly known as hot isostatic pressing ("HIP"). The process is used to consolidate, i.e., densify a variety of material structures. In powder metallurgical applications, for example, the powdered metal is poured into a container. The container is then outgassed, sealed, and transferred into the HIP unit. The container is then subjected to high temperature and pressure for a period of time. During the HIP cycle the individual powder grains are consolidated and the voids or porosity interposed between adjacent grains are eliminated. Typically, the resulting structure is fully densified, more structurally homogenous and very close to its final shape. HIPing may also be used to consolidate any other solid structures such as castings and forgings.

Not surprisingly, there are inherent drawbacks associated with consolidation processes such as HIP. The most significant drawback is simply the high cost of performing these operations.

In the conventional process control setting, a preset control algorithm forms the basis for process actuation of a time-temperature-pressure schedule aimed at full densification of material structures such as powder compacts. Sensing usually consists of a network of thermocouples and pressure gauges located within the consolidation chamber. The process parameters are continuously monitored for deviations from the prescribed set point values for temperature and pressure, and any deviations therefrom are corrected through actuation. Thus, the feedback control is based exclusively on pressure and temperature. Importantly, however, this type of process control does not monitor the material response, but only the consolidation environment. Practically speaking, the conventional approach to process control only addresses part of the problem, i.e. process environment, and does not address the more difficult issue of material response.

A more powerful approach to reducing the cost of material consolidation processing is through excerising control of the material state. This approach involves the monitoring and adjusting consolidation process parameters—while the consolidation process is actually being conducted. This, of course, permits the user to ascertain how the consolidation process is progressing. Moreover, to the extent that material behavior deviates from what was initially predicted during simulation and design optimization, the process control functions permit the appropriate process parameters to reverse the deviation.

The missing link in the process control chain is the means for directly monitoring and comparing the actual material response to the targeted response at each stage of the consolidation process. To accomplish that requires two things, namely, an in-situ sensing device which can monitor material response and provide data, and second an external, open control loop for receiving and processing the data from the in-situ sensor. Specifically, the external control processes the data in order to determine material density, grain size and other micromechanical or microstructural properties which dictate the final product properties.

In one type of a more advanced process control environment, referred to herein as Intelligent Processing of Materials (IPM), density and microstructure are directly controlled through the combination of in-situ sensing coupled with an on-line intelligent, user interactive, process controller which interfaces with a sophisticated simulation system that in turn processes and integrates the sensor data. The simulation system makes comparisons between the actual and expected process trajectories, identifies and quantifies deviations and then generates process schedule adjustments to correct for deviations between actual and expected material response. The process control operator then evaluates the recommendations, in light of the system constraints and processing goals and institutes the appropriate process control response. IPM is neither a statistical process control nor an increased use of existing sensors, such as temperature, pressure and flow rate sensors. Further, IPM is not a fixed, computer-controlled process trajectory in process variable space. Moreover, its is not research into artificial intelligence, although it may draw upon artificial intelligence to assist in processing and integrating the sensor data, and formulating corrective action.

In an IPM environment, the in-situ sensing is coupled to an extrinsic control loop incorporated as part of the control system. The sensing device provides continuous material response capability and thus, the state of the material may be identified at any time during the consolidation process. Comparisons of the actual material response, and/or consolidation path, are made against those predicted by the simulation system. The simulation system operates in such a manner that it can integrate the sensor data using the appropriate constitutive equations that govern material densification, grain growth and other microstructural properties, linking those material properties to the macroscopic material behavior exhibited by the specimens being consolidated.

In the IPM environment, a critical consideration is the effectiveness of the simulation system for purposes of providing initial material consolidation schedules and component designs, and for monitoring, comparing and correcting actual material response to insure attaining the desired properties in the finished products. Ideally, the optimum simulation system would be totally accurate in making predictions, would be applicable to all materials in whatever forms, and would be quick and easy to operate. At present, such a system does not exist. Although simulation and modeling systems do exist, as explained below, there are a number of limitations inherent to most of those systems.

With process simulation, a proposed component design and selected material are subjected to a consolidation schedule (time, temperature and pressure). By then simulating the consolidation process, subject to these schedule parameters, the material behavior may be modeled in order to predict how that component would actually respond if the test were physically carried out. The primary purpose of simulation is to minimize the need for experimental testing.

A number of simulation systems have been developed over the years, however, their effectiveness is limited. These limitations include simulation systems that are restricted only to one or two dimensional analyses thereby precluding their applicability to complex geometries, or systems based on empirical data obtained through ad hoc experimental testing on a single material or class of materials thereby limiting these system's applicability to single material simulation. A further limitation in many models, is that the system does not model all of the densification mechanisms which affect the accuracy of the final solution. Additionally, many of the simulation systems do not simulate material behavior through the broad range of relative densities typically encountered in the materials being consolidated. Thus, empirical models derived from testing of Stage II material structures (relative density $>0.90$) may not accurately predict the material response of Stage I material structures (relative density $<0.90$).

An example of some of the above cited limitations is demonstrated by the HIP process simulation program developed by Abouaf et al.

Abouaf et al. is illustrative of the ad hoc modeling approach because the constitutive equations which form the basis of the modeling solution are derived from experimental testing of a single material: an Astroloy powder. Thus, the constitutive equations are limited to Astroloy. Additionally, Abouaf is limited to two-dimensional FEM analysis of the axisymmetric components. Although Abouaf et al. do model mechanisms for plasticity and creep, modeling of densification by diffusion is absent.

Another example of a simulation system is the DEFORM ™ System by Battelle, Columbus, Ohio (DEFORM is an achronym for Design Environment for Forming). That modeling system is based upon rigid-plastic formulation which disregards elastic responses and only models the plasticity densification mechanism. Because of these various limitations, the simulation results may require further refining through experimental testing before the proposed process can be introduced into production.

In formulating these simulation systems, a system designer must also identify and implement numerous relationships which describe the physical and mechanical behavior of the material. Not surprisingly, these relationships can be quite complicated to define depending on the underlying assumptions. Successfully implementing them into a software modeling program thereby represents a considerable accomplishment. Often times simplifying assumptions may be made in developing the constitutive relationship in order to make the solutions more manageable. As a consequence, however, these assumptions may represent significant limitations in the constitutive relationships thereby limiting the scope of their application. Moreover, those fundamental physical and mechanical limitations are part of the chosen solution and they cannot be "designed out" when adapting the constitutive relationships into a modeling or control system. Thus, while the underlying assumptions ma simplify the development of the constitutive relationship, the resulting modeling or control system cannot overcome the limitations inherent in the solution.

Another problem associated with the development of software programs in general, and especially those based upon FEM, is that such programs are particularly susceptible to generating solutions that are physically impossible to implement. On the other hand, a simulation output can be numerically stable, but physically unstable due, for example, to nonlinear distortions which cause buckling, collapse, and the like. It is important that the software program and subroutines upon which the simulation system is based, can consistently generate stable solutions which do not influence or otherwise interfere with the prediction of physical instabilities.

Additionally, it is highly desirable that the simulation system provide the user with versatile output visualization capabilities. The need for visual representations of the model are apparent, given the limited utility of a tabulated data output. Many of the programs presently available do incorporate graphics packages for limited output visualization. For example, the previously discussed DEFORM ™ program and the HIPNAS ™ program (a product of Kobe Steel) as well as Abouaf et al. have visualization capabilities. In addition to output visualization, however, it is desirable to have a highly cognitive user-interface which allows for output review at any time during the simulation, and further permits the user to optimize the consolidation process by modifying component design, material selection and properties as well as consolidation parameters, (time, temperature and pressure).

It is useful to provide process simulation functions, which has both simulation and modeling capabilities, and also permits user feedback for purposes of design/process optimization.

Based on the foregoing, it is clear that there exists a need for IPM, and that such a control environment is especially important as materials technology advances and newer high technology materials are developed. Therefore, even though modeling systems and consolidation process control both represent cost savings to the end user, there still exists a need for a diversified material consolidation control system having functional capabilities for simulation, component design and the process schedule optimization and interactive or active process control in production setting. An ideal system would not only allow the user to simulate the response of a material subjected to a prescribed consolidation environment, but would also allow the user to optimize material selection, component design and consolidation schedule as well. The optimized processing parameters would constitute input for the intelligent controller which would then initiate the consolidation cycle. Material sensing equipment would feed data back to the simulation system which would in turn integrate the data using the same modeling information used to arrive at the initial set of process parameters. The simulation would then make comparisons of the actual to the expected process trajectory and would generate recommendations to the system operator as to what corrective actions may be taken.

SUMMARY OF THE INVENTION

In view of the foregoing, it is apparent that a need exists for a material consolidation process control and design system which utilizes finite element methods as a framework upon which to build a program that controls models and predicts the behavior of material components during consolidation processing. It is, therefore, a primary object of the invention to provide a process and apparatus for controlling and simulating the consolidation of proposed material forms into more fully densified structures and that provides the system operator with critical planning, optimization and feedback capabilities.

It is a further object of the invention to provide a materials including castings and forgings and powder or particle compacts.

It is yet another object of the invention to provide a system that can be used to control and simulate consolidation processing of all types of materials including metals, ceramics, glasses, composites and combinations thereof.

It is still another object of the invention to provide a material consolidation control system which is coupled to a highly cognitive user-interface capable of providing the system operator with a visual and graphical representation of the simulation output obtained from the FEM system.

It is yet a further object of the invention to provide a material consolidation control system whereby the user-interface is highly interactive thus allowing the user to utilize feedback to optimize the component design or process schedule by modifying the component design, material parameters or consolidation path.

It is yet another object of the present invention to provide a material consolidation control system which provides for feedback control of the actual consolidation process, thereby allowing the user to monitor the consolidation process as the material structures are physically transformed into more fully densified structures.

It is still another object of the invention to provide a material consolidation control system which permits adjustments or changes to an ongoing consolidation process.

It is an additional object of the present invention to provide a material consolidation control system that implements an FEM System platform which models, optimizes, visualizes and controls every step of the consolidation process beginning with simulated structures through to the physically transformed, fully densified finished product.

It is a further object of the invention to provide a material consolidation control system which is capable of modeling in one, two or three dimensions.

It is yet a further object of the invention to provide a material consolidation control system to control the densification of material structures throughout Stage I and Stage II, as well as during the transition zone which exists when material modeling progresses from Stage I to Stage II, whereby the densification of material structures have relative densities in the range of 0.60 up to 1.00.

It is another object of the present invention to provide a material consolidation control system which is capable of predicting macroscopic and microscopic shape changes.

It is a further object of the invention to provide a material consolidation control system which can model the effects of container surfaces and parameters on the consolidation process.

It is yet another object of the present invention to provide a material consolidation control system which can predict the occurrence of physical instabilities in the proposed structure.

It is a further object of the invention to provide a material consolidation control system which can predict densification on a macroscopic and microscopic basis.

It is further object of the present invention to provide a material consolidation control system which can predict numerous other material responses, including dilational and distortional displacements, stress-strain states during and following the consolidation process, and thermal states as a function of the consolidation path, as well as the final stress-strain states of the specimen following consolidation and cool down.

It is another object of the invention to provide a system which can model and predict the material response of a specimen control subjected to arbitrary mechanical and thermal processing of the sort typically encountered in consolidation processing.

It is yet another object of the present invention to provide a material consolidation control system which utilizes FEM as a framework for implementing the constitutive relations which govern the material behavior when exposed to the consolidation process.

It is further object of the present invention to provide a material consolidation control system which implements constitutive relations HIP governing densification mechanisms by plasticity, power-law creep and diffusion mechanisms.

It is another object of the invention to provide a material consolidation control system which interrelates the constitutive relations HIPs governing the various densification mechanisms.

It is another object of the invention to provide material consolidation control system which implements constitutive relations HIPs which are premised on continuum mechanics and micromechanical material parameters.

It is an additional object of the present invention to provide a material consolidation control system which implements separate and distinct sets of constitutive relations HIPs applicable to Stage I and Stage II densification, respectively.

It is yet another object of this invention to provide a material consolidation control system that consistently yields convergent, stable simulation solutions.

It is another object of this invention to provide a material consolidation system which implements the constitutive relations HIPs governing the densification process in a material routine which may be adapted to any FEM platform.

It is still another object of this invention to provide a material consolidation control system that operates using objective input or feedback data not dependent upon empirical data or curve fitting.

Briefly described, these and other objects of the invention are accomplished by providing a material consolidation control system which utilizes an FEM system platform for the simulation, design, optimization, and interactive control of material consolidation processes. The control system of the present invention involves a hierarchical control arrangement having feedforward and feedback loops which allows the system to construct the simulation model used in the feedforward control loop and also allows the user to analyze the output generated. Moreover, upon reviewing and evaluating the output data, the system operator may then optimize the component design, or the process schedule, by modifying the process parameters initially entered into the system. The user-interface utilizes a means for creating a visual representation of the output data and whatever format is selected by the system operator.

In the preferred embodiment of the present invention, the control system further incorporates an FEM System which incorporates the constitutive relationships which form the basis for simulating the response of a material subjected to thermo-mechanical loading, such as that typically encountered in consolidation processing. The FEM System describes the stress-strain behavior of a powder for any porosity condition beginning at initial packing densities through the entire densification process to fully densified material structures. The control system of the present invention directly links the evolution of material microstructure to the corresponding macrostructural effects and includes densification mechanisms for plasticity, power-law creep, and diffusion. Information pertaining to the material parameters used in the feed forward control system, are described in terms of the material's microstructural characteristics.

The material subroutine which performs the numerical implementation of the constitutive relationships is designed to provide a numerically stable integration environment which consistently yields stable, convergent solutions. The control system, and in particular the FEM System, are equally applicable to most classes of materials. Moreover, the FEM System can generate solutions for three dimensional analyses, and from a simulation standpoint, the FEM System can effectively model nonlinear dimensional changes including fully developed shape predictions at any stage during or after completion of the simulated consolidation process.

In addition to the simulation and design optimization capabilities of the invention, MCCS also performs a process control function. The process control functions include monitoring the ongoing consolidation process and comparing the actual process trajectory with the design trajectory generated through the simulation conducted under the FEM System. Moreover, once MCCS identifies process or material response deviations, it notifies the operator who then evaluates the data and where appropriate, takes corrective action. Thus, MCCS facilitates the intelligent processing of materials by providing the system operator wit sufficient information to permit preventive-type corrections to the consolidation process, as opposed to remedial-type corrections taken after the process is concluded.

It should be noted that references made to "process control" and the like, are directed to the preferred embodiment of the present invention, and are premised upon a user interactive feedforward process control loop which recommends an appropriate corrective action. The user may then reject or implement the recommendations. Alternatively, the feedforward loop can be entirely closed by being derived from material-based conditions provided from process sensors.

With these and other objects, advantages and features of the invention that may become hereinafter apparent, the nature of the invention may be more clearly understood by reference to the following detailed description of the invention, the appended claims and to the several drawings attached herein.

BRIEF DESCRIPTION OF THE DRAWINGS

FIG. 2 is a block flow diagram of the material consolidation control system user-interface and the FEM System;

FIG. 7 is an operational flow diagram for the FEM System material subroutine;

FIGS. 8a–8d are detailed flow diagrams of the MCCS material subroutine;

DETAILED DESCRIPTION OF THE INVENTION

The Materials Consolidation-Control System (MCCS) is a finite element method (FEM) based system for the design and evaluation of material consolidation processes including the design of canister (encapsulent), pressure, and temperature schedules. Additionally, MCCS provides users interactive, on-line control of product properties through a combination of on-site sensors and process/component simulation output. MCCS is designed to operate on workstations such as the Sun Microsystems 4370, the Silicon Graphics 4D25 or other systems with comparable processing memory and graphics capabilities.

The term "control", as used in the present context, encompasses the simulation and optimization of component design and consolidation paths and further extends to interactive process control whereby the system monitors and compares actual consolidation result with those obtained through the simulation and provides control signals to consolidation equipment. Although the implementation of this invention is not limited to a particular consolidation device, examples of equipment that can be controlled by the MCCS include HIP units, cold isostatic pressing (CIP) units, die casting machines, as well as extrusion and forging presses to name just a few. When in operation the system permits the operator to modify or otherwise adjust the consolidation parameters of time, temperature and pressure.

In the preferred embodiment of the MCCS the system is set up to simulate and control consolidation of powder material compacts using HIP. However, the designations and descriptions set forth in the discussion which follows is equally applicable to all other powder consolidation processes. Additionally, the preferred embodiment may be adapted to other material forms.

Figure 1A:
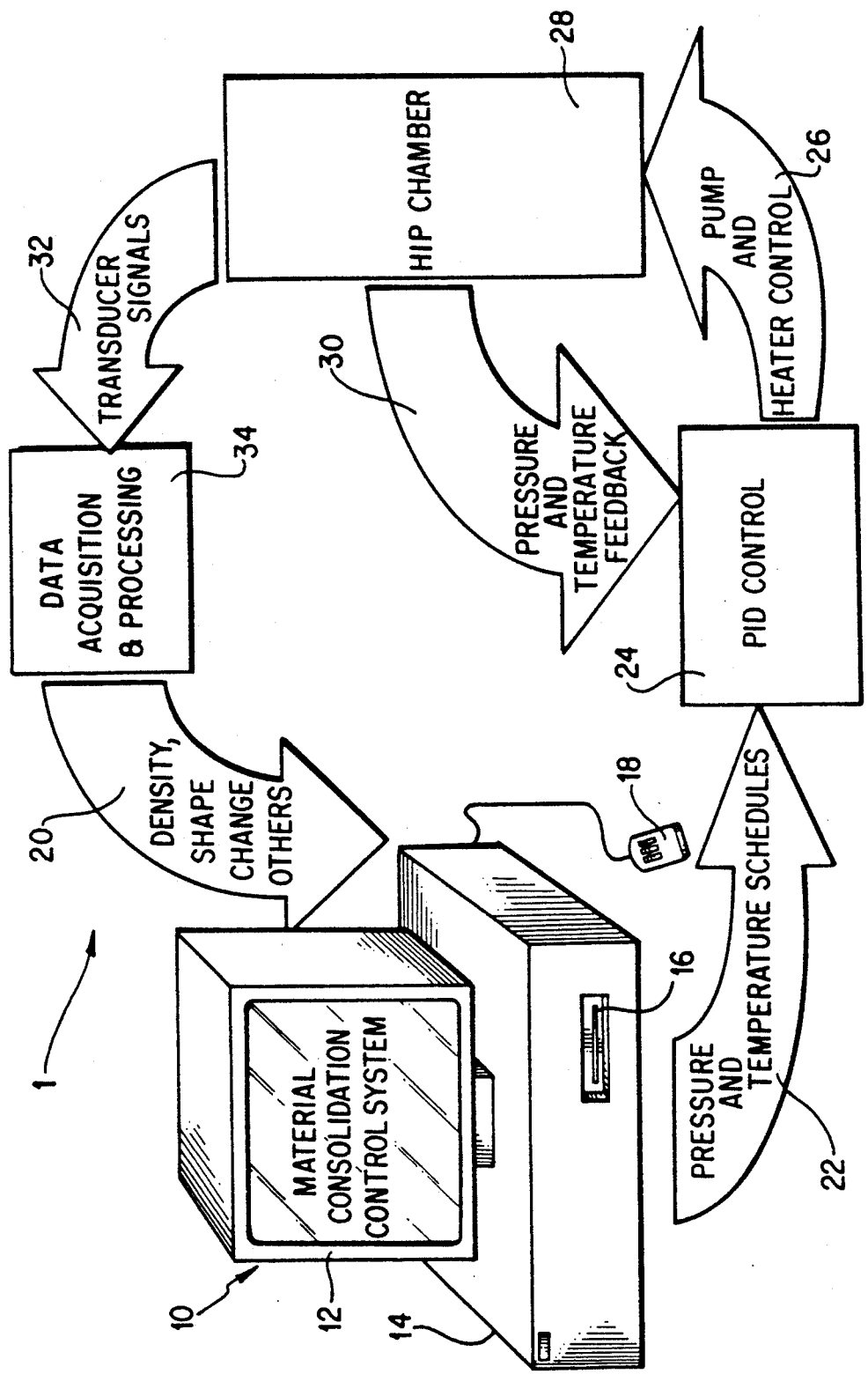
FIGS. 1a–1c are block diagrams of the material consolidation control system forming the present invention.

FIG. 1a is a block diagram overview of the MCCS control system forming the present invention. The control system MCCS incorporates a design system environment. The design features include a user-interface which directly interfaces with an FEM pre and post-processor software platform. The system environment and user-interface interact with the FEM simulation system which consists of an FEM software platform, such as ABAQUS, and specially developed micromechanics-based constitutive relationships implemented into the MCCS material subroutine. The program START encompasses identifying, compiling and linking all subroutines required to develop an executable main program.

The process control system 1 involves a hierarchical control system comprising a PID feedback loop and an MCCS feedforward loop is provided. The control hardware includes a work station 10 consisting of a graphics display screen 12, a CPU 14 having a disk drive and a floppy drive 16 and a mouse control 18. As previously discussed, the MCCS computer 10 is designed to receive process sensor data 20 and then provide process control parameters 22 to a PID controller 24 The PID controller, performs a proportional, integral, and derivative calculations of the scheduled input to, in turn, derive control signals 26. The control signals 26 are then provided to a heater and pump (not shown) located in HIPs chamber 28.

Two forms of feedback are then gauged from the HIP chamber. First temperature and pressure feedback data 30 are looped back to the PID controller 24 in order to update pump and heater control signals 26. A second group of feedback signals comprising transducer signals are also sensed from the HIP chamber and provided via a loop path 32 to a data acquisition and processing module 34. The transducer signals are then interpreted and processed such that density, grain size, shape, material change and other consolidation data are separated and provided via control flow path 20 to controller processor 10.

The MCCS control system embodied in the computer 10 them employs the MCCS design environment to provide further control modeling and thereby produce feedforward control signals and schedules 22. As a result, a closed loop feedforward predictive control process is realized based not only on HIP chamber feedback signals but on actual material state-of-change signals produced by the transducer 32. Accordingly, complete control of all phases of the densification and consolidation processes can be maintained with maximum efficiency and minimum user interaction. In addition, by the interposition of transducer signals related to the actual material states, the control system can be provided to any material since the rate of change particular to specific material types is incorporated into the feedback loop.

Figure 1B:
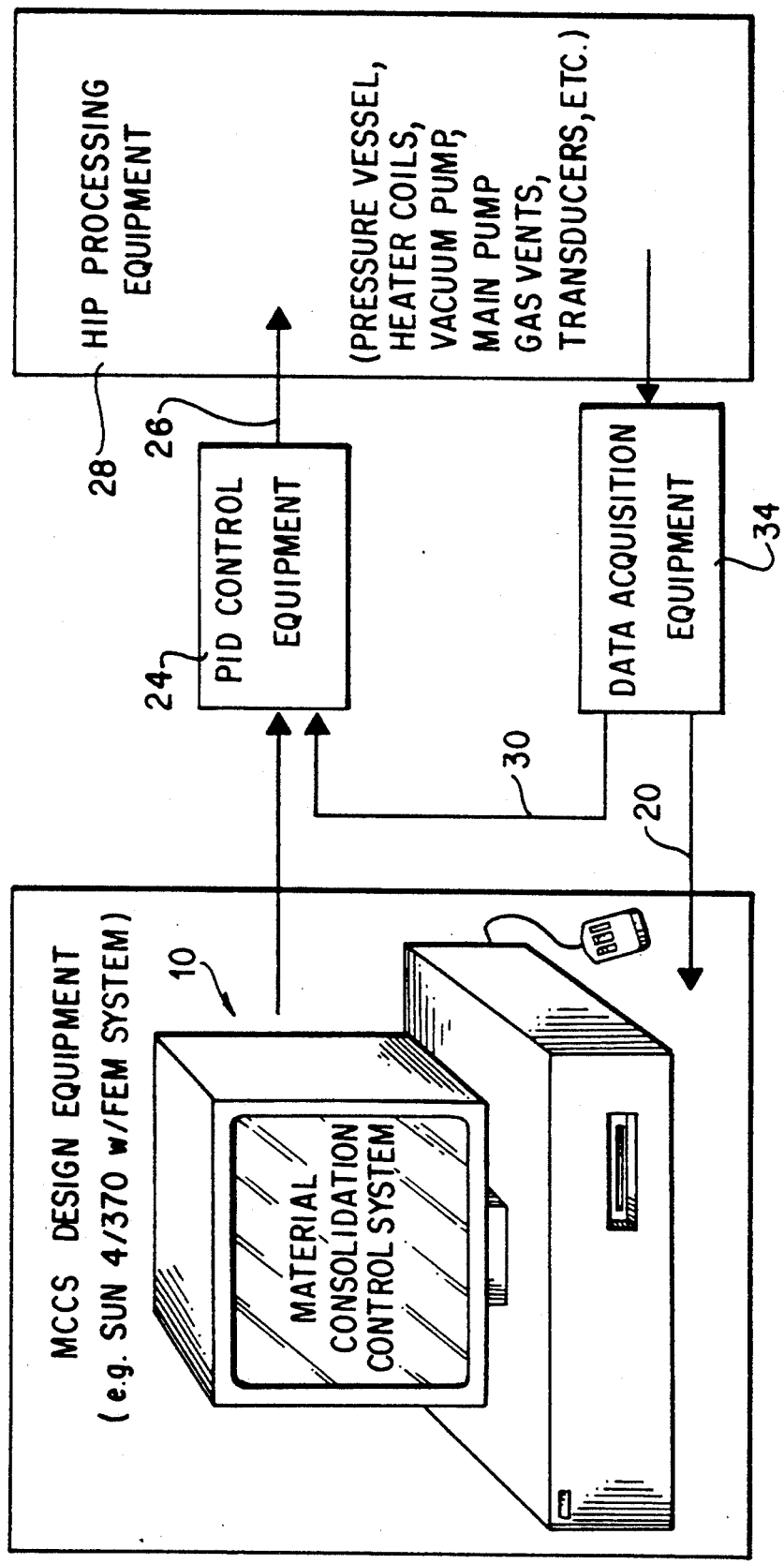

Referring now to FIG. 1b an overview of the consolidation control system hardware is shown in block diagram form. Four main hardware elements are shown. The MCCS design equipment 10 comprises the aforedescribed computer work-station graphic terminal and mouse controller. The PID controller 24 which is adapted to receive feed forward control information from the MCCS 10 and provide PID control data 26 to the HIP chamber 28 consists of any conventionally known PID type control device. An example of such device is the MicRIcon controller model no. 82-322 manufactured by RI Research, Inc. The MicRIcon controller is based on a standard RS-232 interface. However, any other conventionally known or used PID controller may be provided. PID control information is then provided to the HIP chamber. An example of an HIP chamber includes the ASEA model Q19 autoclave device. Although HIPing is described in detail, this is only one application for the present invention as previously noted. For example, the system can be applied to vacuum hot pressing or extrusion equipment such that temperature pressure and time as well as mechanical force parameters would be used in the PID control loop.

The HIP equipment also includes various sensor to measure conditions in the autoclave. As a result, information from the heater coils, the vacuum pump and the main pump are typically sensed from the HIP autoclave and fed back to the PID controller. Non-PID variables are processed by data acquisition hardware 34. An example of a typical data acquisition device used in the present system is the Hewlett-Packard impedence analyzer.

Data input to the data acquisition equipment 34 derives from various transducers located within the HIP autoclave. These transducers are typically eddy current transducers which track the density, shape and grain size of the material located within the autoclave by measuring the complex impedences within the material and applying the sensed impedences to the acquisition circuit 34 for processing. These processed variables are then passed along line 20 to the MCCS 10. As a result, a feedback loop consisting of the PID control signals and data is provided as well as an outer feedforward loop consisting of the MCCS control and data signals. Additionally, while a closed inner and outer loop is described, the present invention may be implemented in an open outer loop and a closed PID loop implementation. In such an implementation, data from the HIP device 28 would only be provided to the PID controller 24. All feedforward data from the MCCS 10 would, be user provided based upon the interactive MCCS design user interface.

Figure 1C:
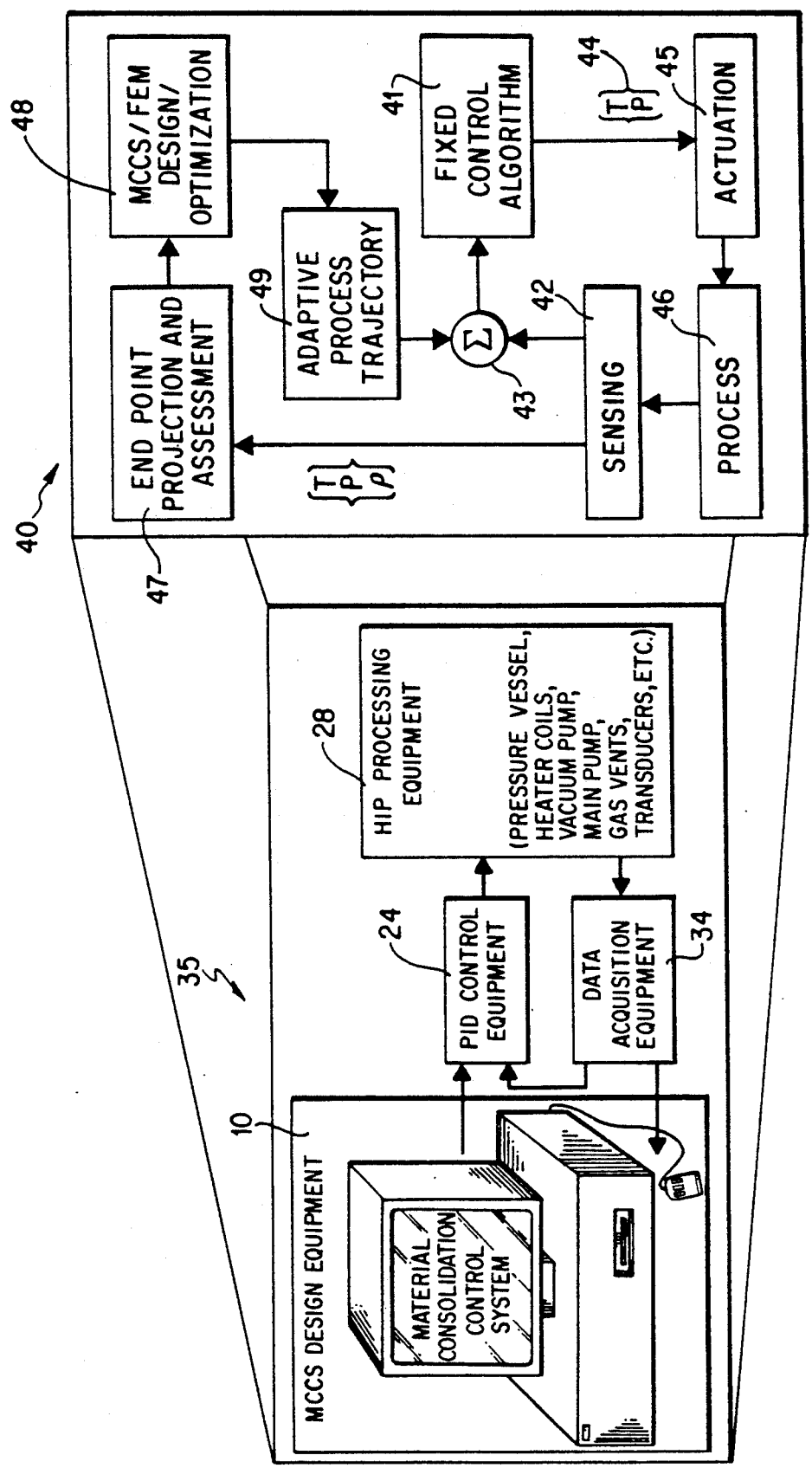

Referring now to FIG. 1c, the detailed block diagram of the material consolidation control device is illustrated. In particular, the hardware implementation diagram of FIG. 1b is shown in box 35 while box 40 shows the detailed control approach to the HIP feedback loop. The PID control algorithm 41 receives data from sensors 42 through a summing circuit 43. Paramaters provided from the algorithm include temperature T and pressure P which are in turn provided to various actuators located within the HIP equipment. The actuators in turn provide changed conditions to the process 46 which is picked up by the various transducers and sensors 42. Sensors 42 also provide, as previously described, material information to the MCCS control system. The system then projects the end point assessment at stage 47 and provides that assessment to the MCCS FEM design optimizer at step 48. The adaptive process trajectory data is then calculated and the data schedule is then applied as a feedforward control signal to the PID controller operating on the fixed control algorithm 41. As previously discussed, the signals are then passed on to the actuators 45 to ultimately control the process 46.

FIG. 2 illustrates the MCCS System Environment. The system environment 52 includes the user-interface 54 which is based upon a FEM platform having pre- and post-processor functions 56, through the user interface, the user can readily interact with the FEM system 60, which for the preferred embodiment incorporates as the FEM software platform 60 ABAQUS. The FEM System also utilizes a specially developed Material Subroutine at which implements the constitutive relationships governing the material response 66.

Figure 3:
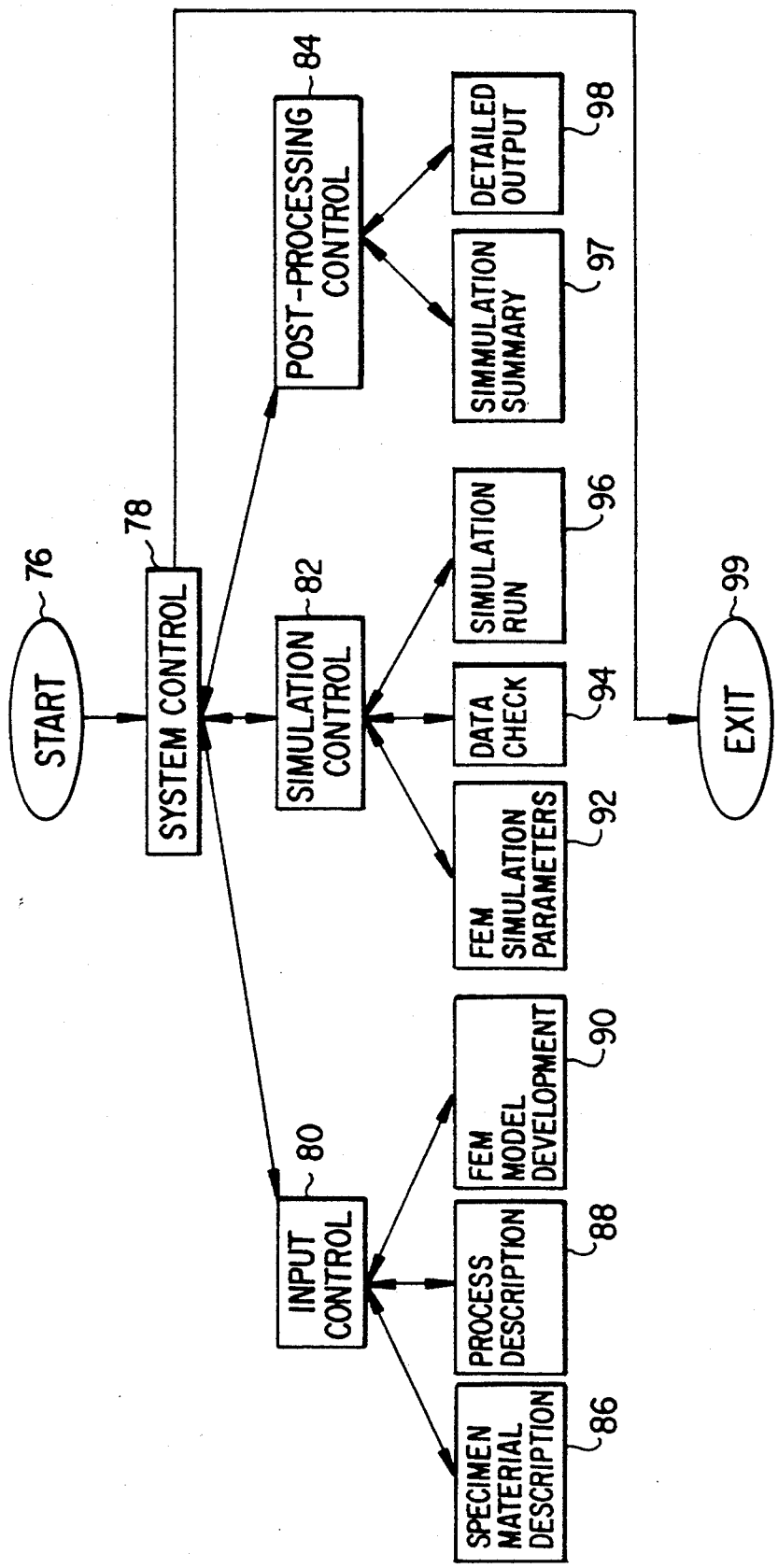
FIG. 3 is a block diagram representing the MCCS environment.

As shown in FIG. 3 the system control, provides access to the input, simulation, and post-processing phases of the system, file system management, and system exit. Input to the system control 78 routine is gained through the system START function 76 or through the return from any of the three subelement controls: input 80, simulation 82, and post-processing 84. Through the system control routine 78, the user is provided access to the system file management system or can transfer to any subelement, or can simply exit the MCCS.

The subelement controls provide access to subelement functions, subelement file management, and access back to the system control. The input control 80 links the system control with the input phase of the system. The functions of the input control 8 include specimen material description function 86, consolidation process description 88, and FEM model development segment 90. The simulation control 82 in turn provides access to the simulation parameters 92, checks on the FEM data input files 94, and submits simulations to the FEM system for execution 96. The post-processing control links the system control routine 78 to the summary and detailed outputs, 97 and 98, respectively.

The input control 80 of the MCCS provides the user-interface with various input functions as well a directly linking data to the FEM pre and post-processing software platform. The input phase is necessary to develop new input data files, load existing data files, and edit input databases.

The specimen material description 86 allows the user to access the material description files for the material parameters, and for the canister (if used in the subject process). In particular the material parameters are grouped by this function into four major categories: General Properties, Mechanical Properties, Diffusion Properties, and Particle Characteristics. The General Properties category typically includes the solid density, the melting point, the atomic or molecular weight, the weighted atom-volume, and the surface energy 8 the material. The Mechanical Properties category considers Young's modulus as a function of temperature, Poisson's ratio as a function of temperature, yield stress as a function of temperature, powder particle hardening, the power-law creep exponent as a function of temperature, the power-law creep reference stress, and the activation energy for power-law creep. The Diffusion Properties category includes pre-exponential and activation energy for volume boundary diffusion while the Particle Characteristics category covers the initial powder packing relative density and the particle size distribution expressed in terms of a normal, lognormal, or bimodal distribution. Similarly, for powder applications, the canister material properties required for the MCCS include Young's Modulus as a function of temperature, Poisson's ratio as a function of temperature, yield stress as a function of temperature, and a hardening parameter. The user also has the option in this function to select powder material and canister material descriptions from the MCCS database, edit the MCCS material description database and store as a new file, or generate new powder material ("P/M") and/or canister material description files. The system provides the user with an editing template for creating or editing existing material description databases.

The second function of the input control phase is the consolidation Process Description function. Upon entering the Process Description function 88, the user first defines the type of consolidation process to be used in the simulation as either hot-isostatic pressing (HIP), cold isostatic pressing (CIP), sintering, hot pressing, isothermal forging, or extrusion. Using HIP as an example, the user is then prompted to load or edit an HIP schedule. Creating or editing the HIP schedule requires defining pressure and temperature cycles as a function of time. The cycles are described by end points differentiating straight line segments. After the HIP cycle is defined, the user has the option to view plots of the pressure and temperature cycles.

The last segment of the input control phase is the FEM Model Development function 90. This function involves the developing of an FEM grid or mesh for the undefined specimen which includes the canister and its compacted P/M contents. The definition process requires identifying element types for both the P/M and the canister, defining interface elements which correspond to the interface which exists between the P/M and the canister, and describing boundary conditions for each of the P/M and canister meshes.

The MCCS user-interface provides the user with a graphical environment to interactively input commands to develop the FEM model and to display the current FEM model configuration. Development of the P/M and canister meshes requires defining reference perimeter lines, developing reference plans or volumes based on the perimeter lines, automatically generating FEM nodes and elements on the reference plans/volumes, and defining the P/M and canister element types.

Once the P/M and canister meshes have been generated onto the user-interface the next step is to define interface elements between the P/M and canister. Interface elements provide an extra degree of freedom between the P/M and canister since the canister cannot transfer tensile stresses to the P/M during the early stages of the consolidation process, such as in the initial heating cycle. At the same time the interface elements allow the canister to transfer compressive forces to the P/M, the compressive forces are generated during the pressurization cycle when the HIP load is applied to a specimen within the HIP chamber.

The last step in developing in the FEM model function is the FEM grid boundary condition definition. Boundary conditions are necessary to complete a symmetric FEM model, to define the static support conditions for the specimen, or in the case of extrusion processes, to define the die outline and frictional interface.

The next step in the MCCS system control process is the simulation control 82 which consists of FEM simulation parameter definition function 92, an MCCS data check function 94, and a simulation run routine 96 for submitting the proposed models to the MCCS FEM System for execution. The FEM simulation parameters function defines the simulation title, the base input files, the output file options, the simulation convergence criteria, the initial time/load increment size, the maximum number of iterations per increment, and the total number of increments.

More particularly, the base input files are the current input files defined or loaded in the input phase. The user has the option to choose different base input files for the simulation. The output file options allow the user to individually select the types of output desired for the post-processing phase. The output file options include deformed versus undeformed mesh, target shape versus simulation shape at the end of the process cycle, temperature contours, density contours, stress contours, strain contours, and reaction loads. Stress contours at the end of the process cycle comprise the projected residual stresses of the specimen. The user is also required to specify the frequency of the output either by load/time increment and/or at the pressure/temperature reference points After all simulation parameters have been defined, the system then checks the data for consistency and input errors in the data check function 94. After the data check function 94 is complete, the user submits the model for execution via the simulation run control function 96.

The post-processing control 84 permits the user to view a simulation summary 97 at any time during the simulation run in order to monitor the progress of the simulation. At the conclusion of the run, the user may ask for a detailed output 98 of the results.

Figure 4:
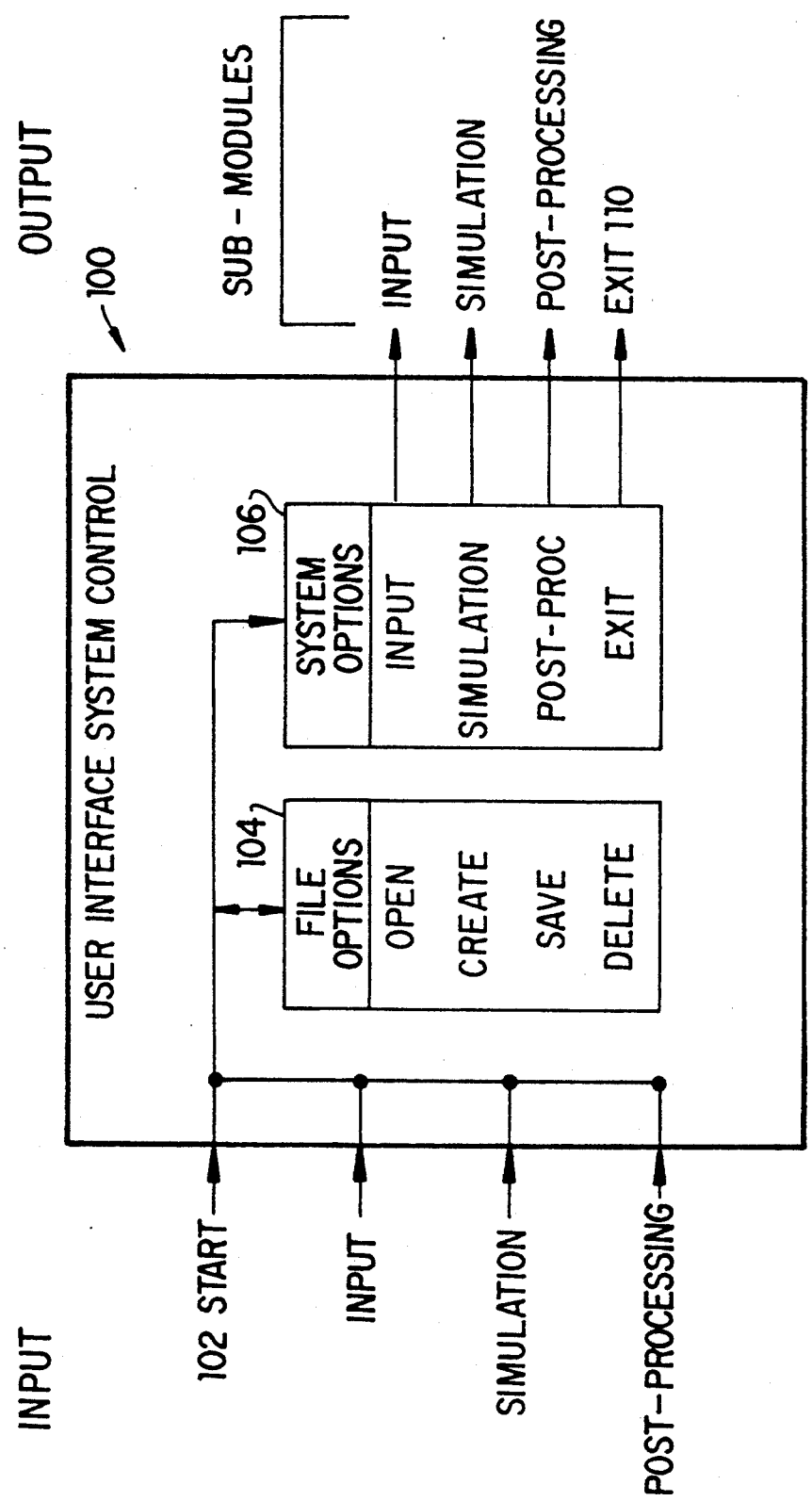
FIG. 4 is a block flow/architectural diagram of the MCCS system control.

FIG. 4 illustrates the user-interface System Control 100. The program start 102 encompasses identifying, compiling, and linking all subroutines required to develop an executable main program. The user-interface System Control 100 provides the system operator with access to any subelement of the system through the control interface. The user may access file options 104, and system options 106 and includes the system exit 110.

Figure 5:
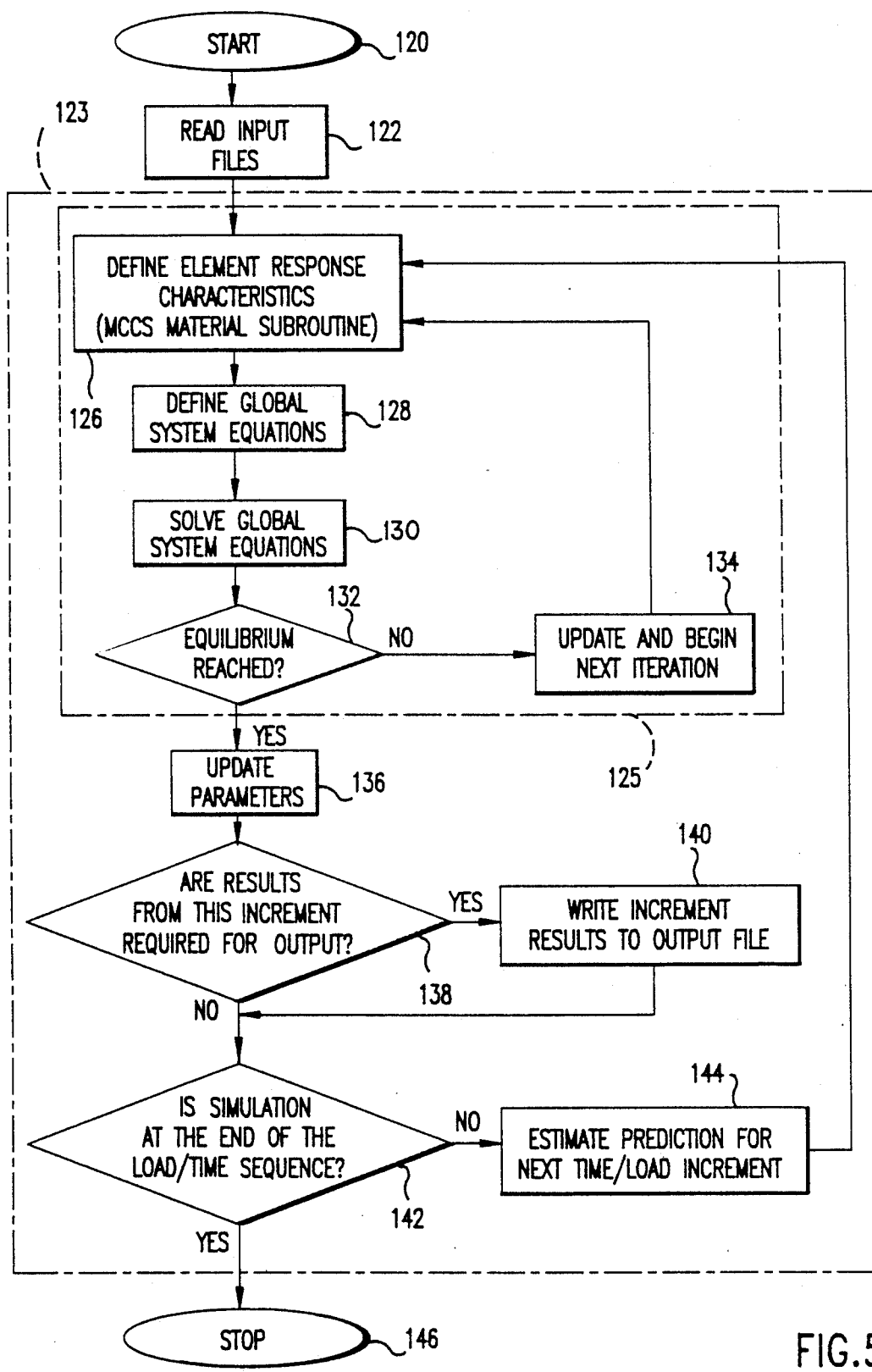
FIG. 5 is an operational flow diagram for the MCCS FEM system.

Shown in FIG. 5 is a flowchart which illustrates the operational overview of the FEM System described in further detail in FIGS. 6a–6e. At the start 120, the program activity begins. The first step is to read the data contained in the input file 22. After the read input is accomplished, the solution progresses into the time/load integration loop 123, and the solution iteration loop 125. The next phase of the solution is the defining of element response characteristics step 126 which includes calling the material subroutine. As the solution progresses, it defines global system equations 128, solves global system equations 130, and determines whether or not the solution has reached equilibrium 132. If the solution has not reached equilibrium, the program returns to defining element response characteristics 126 after the iteration cycle is updated 134. If the solution has reached equilibrium, the parameters are updated 136 and the results for the current increment are compared against output commands 138. If the results for the current increment has been previously identified for output purposes, the results are written to an output file 140. If the results are not to be written into an output file, the solution is tested to determine if the end of the load/time sequence has been reached 142. If the simulation has not reached the end of the load/time sequence, the increment is loaded 144 and the program returns to the material subroutine 126. If the simulation has reached the end of the load/time sequence, the program stops at 146.

The detailed flowcharts for the MCCS FEM System described above are shown in FIGS. 6a–e and are based upon the FEM software platform known as ABAQUS. The FEM System is invoked by the MCCS System when the user selects the Data Check function 94 or Simulation Run function 96 under the Simulation Control 82 as previously discussed with reference to FIG. 3. The data check function 94 then reviews the data input for consistency and makes assessments regarding the memory and file requirements necessary to execute the simulation. The Simulation Run function 96 then executes the MCCS FEM System. It should be noted that the MCCS FEM System does not require user interaction or oversight during the FEM System execution.

Figure 6A:
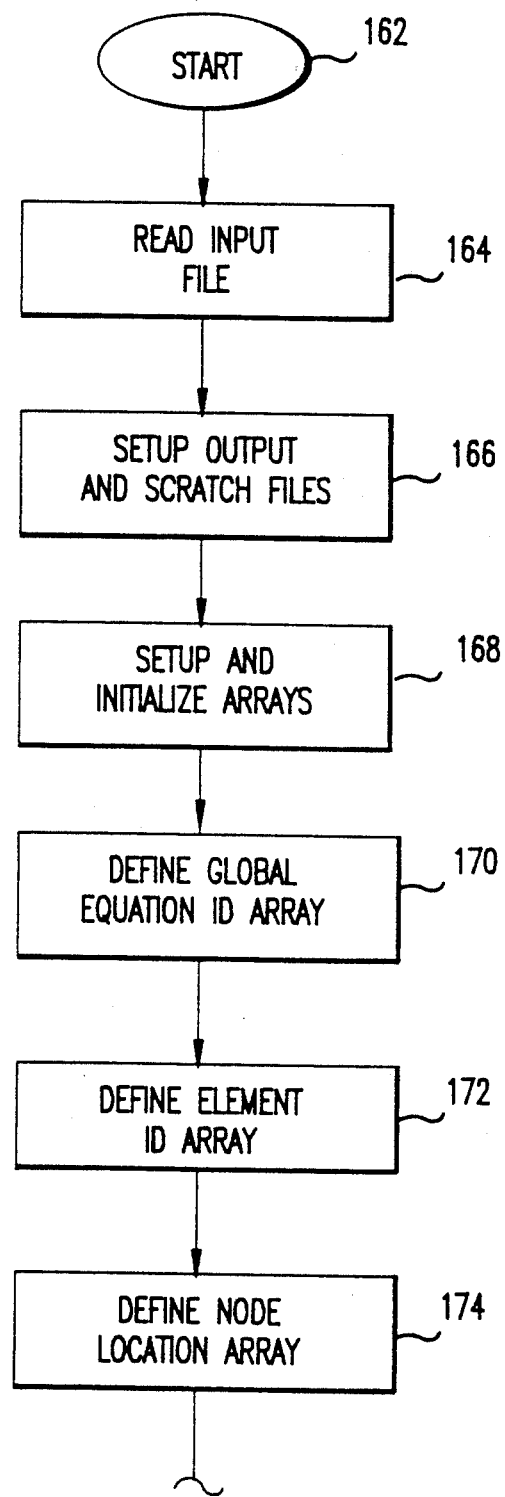
FIGS. 6a–6e are detailed flow diagrams of the MCCS FEM System.

The first phase of the FEM System execution is shown in FIG. 6a which conducts all of the non-iterative steps required to prepare the system to execute the time/load integration and the solution iterations. Following the program START at step 162, the input file is read at step 164 for control information, total number of nodes and elements, and output requirements. The control information includes, among other things, data pertaining to the proposed consolidation schedule, i.e., time, temperature and pressure, specimen configuration, material properties of the structure to be consolidated and, where applicable, the material properties of the container holding the compacted powder. As explained earlier, the system operator must also specify the element configuration used to develop the initial FEM mesh for the specimen. This allows the system to determine the total number of elements, nodes and integration points required to model the specimen as it progresses through the proposed consolidation process.

Next, the MCCS FEM System sets up the required scratch and output files as step 166. The scratch and output files represent the amount of storage capacity or memory required to execute a particular simulation. The amount of storage is dependent upon the total number of nodes and elements specified for the proposed specimen. Each node is assigned as many as three degrees of freedom (DOF). Thus, where the analysis is two-dimensional, i.e., planer, each node has two DOF, whereas in a three dimensional analysis, each node requires three DOF. Therefore, on a global basis, the total number of DOF in the mesh is dictated by the total number of nodes on the mesh. Depending on the number of DOF prescribed in the FEM model, the FEM System typically requires large arrays to conduct the simulation.

With regard to step 168, as is commonly known in the field of computer science, an array is a collection of data items with each item identified by a subscript, key or other identifier is arranged so that the computer can examine the collection and retrieve data items associated with a particular identifier. The total size of these arrays usually exceeds the memory capacity of the hardware and therefore scratch files are required to store arrays which are not currently being processed or extremely large arrays which cannot be completely stored due to their size. Thus, the FEM System dimensions and initializes the global arrays at step 168. The global arrays are defined in the main segment of the executable code and are directly available to any of the subroutines for processing. For example, one of the global arrays is the Nodal Displacement Array which describes the global nodal displacements for the current time/load increment. The next three steps 170, 172 and 174 develop the main reference arrays for the FEM simulation. Reference arrays in this context means that the arrays are used to delineate mapping relationships in going from the local or the nodal/elemental perspective to the global perspective. The first reference array is the Global Equation Identification Array at step 170 which maps each DOF assigned to each node to the corresponding global equation numbers. The Element Identification Array describes and maps at step 172 each element in terms of the nodes that define its boundaries. The last major reference array is the Node Location Array 174 which maps and defines the initial configuration of the FEM grid, i.e., the undeformed compact shape or geometry prior to initiating the consolidation process. Once these global reference arrays have been established, they remain fixed and are not subject to change.

Figure 6B:
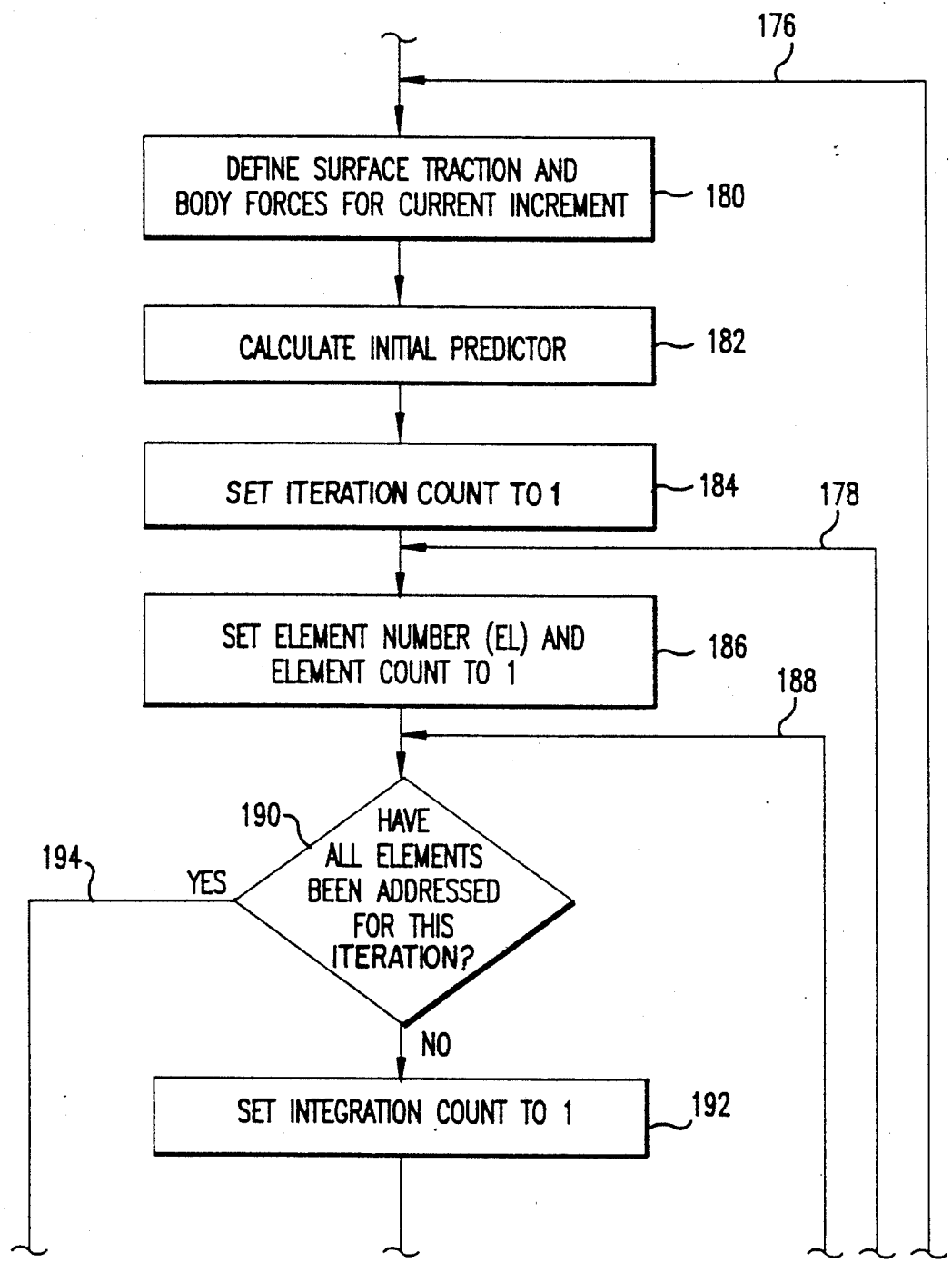

Referring to FIG. 6b the remaining segments of the FEM System conduct the actual simulation. The segments consists primarily of two large loops: TIME/LOAD INTEGRATION LOOP ("TLIL") 176, which governs the time/load integration of the specimen deformation, i.e. the deformation history of the specimen, and the ITERATION CYCLE LOOP ("ICL") 178 which obtains a solution for each time/load increment, over all elements.

The first step in FIG. 6b in the TLIL 176 is to define the forces acting on the specimen for the current load/time increment 180. These forces are referred to as surface traction and internal body forces respectively. Surface traction forces include concentrated loads, distributed loads, and surface pressure loads, such as chamber pressure. Surface traction loads are extremely applied loads. Gravity is an example of an internal body force. The loading conditions existing for the proposed specimen are specified in the input file or may be inferred from the physical characteristics of the specimen (e.g. mass).

Step 182 involves calculating the initial predictor for the deformed shape as a result of a new load increment. The initial predictor provides an initial estimate of the extent of deformation the specimen exhibits when exposed to the next time/load increment. Additionally, the initial predictor functions as a computational starting point from which the next numerical iteration may begin.

The initial predictor is calculated by determining the elastic response of the specimen to the new load increment and adding this incremental elastic response to the integrated deformation state from the previous load/time increment. Once the initial predictor has been determined, the iteration count is set to 1 and the ICL 178 is initiated.

After setting the Element Number and Element Count to 1 at step 186, the program begins the ELEMENT STRESS STATE LOOP ("ESSL") 186, 188. The ESSL loop 188 determines the stress state within each element given the current load increment and the current initial predictor. The first step 190 in the ESSL 188 is to determine if all of the elements in the Global Element Identification Array have been addressed at 192. An element has been "addressed" when the element in question has been processed for the current iteration. The ESSL loops over all elements in the Global Element Identification Array after which the ESSL execution is repeated. Once all the elements have been addressed, then calculation of the stress state is completed for the current iteration and the loop ends at 194.

It is noted that when setting up the Global Element Identification Array (described previously), the element identification may not be sequential and there may be gaps in the array when moving between elements Thus, before integrating the current element, it is necessary to determine if the current element is actually within the array. When it is established that the current element is within the element identification array, the integration count is set to 1 at step 192. The Element Integration Loop shown in FIG. 6c ("EIL") 196–199 then loops over all of the integration points contained within the current element. After all of the integration points for the current element have been addressed 200, then the Element Count and Element Number are incremented by one at step 201 and the EIL begins for the next element.

For each integration point, the MCCS Material Subroutine is called at 198. The MCCS Material Subroutine is shown in FIGS. 7 and 8a–d and is discussed in greater detail in a subsequent section. The Material Subroutine is a key feature of the MCCS FEM System and determines the current stress state for the current element given the assumed deformation state. The Material Subroutine also determines the Jacobian which is defined a the partial differential of the element stress tensor with respect to the element strain tensor. Following the return from the Material Subroutine, the Integration Count is incremented by 1 199 and the EIL 196 is applied to the next integration point iteratively all integration points within the current element have been addressed. At this point the Element Count and Element Number are incremented by one at 201. The EIL and the Material Subroutine are again, called to integrate all points contained in the new "current element".

Figure 6C:
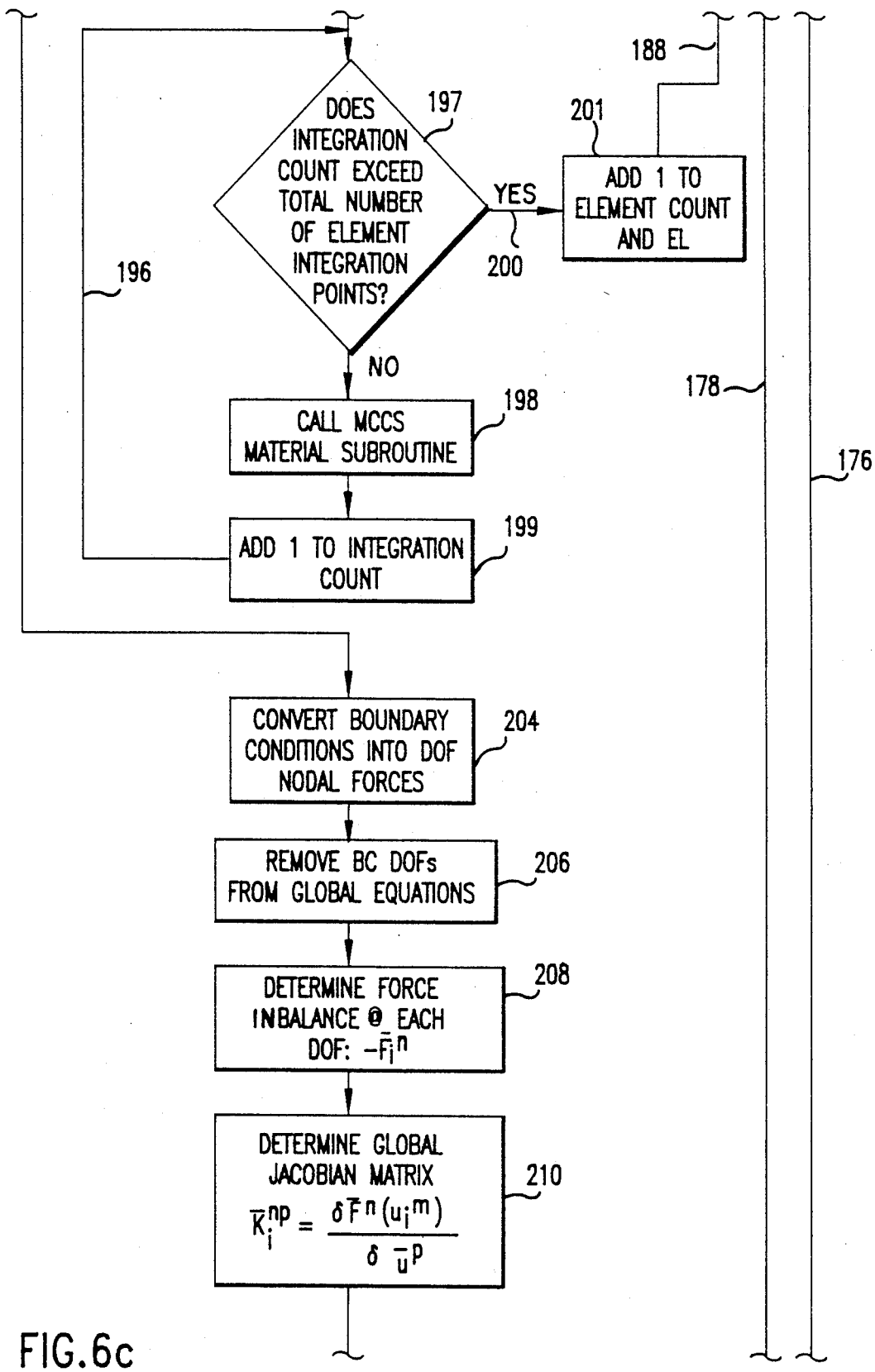

The next operation of the simulation process represented in FIG. 6c is to determine the extent of the force imbalance in the trial solution. This is accomplished on a global basis by eliminating the boundary conditions from the global DOF and coupling the boundary condition effect as an applied load condition for the remaining DOFs at 204, 206. The extent of the force imbalance is then determined on a localized basis by addressing each nodal DOF at 208. A force summation taking into account surface traction and internal forces is conducted for each nodal DOF including external applied loads and internal element stresses. After the force summation, the Global Jacobian Matrix is determined as the partial derivative of the force imbalance for each DOF with respect to each nodal displacement at 210. The Global Jacobian Matrix is derived from the Local Element Stress Jacobian matrices which were calculated in the MCCS Material Subroutine.

Figure 6D:
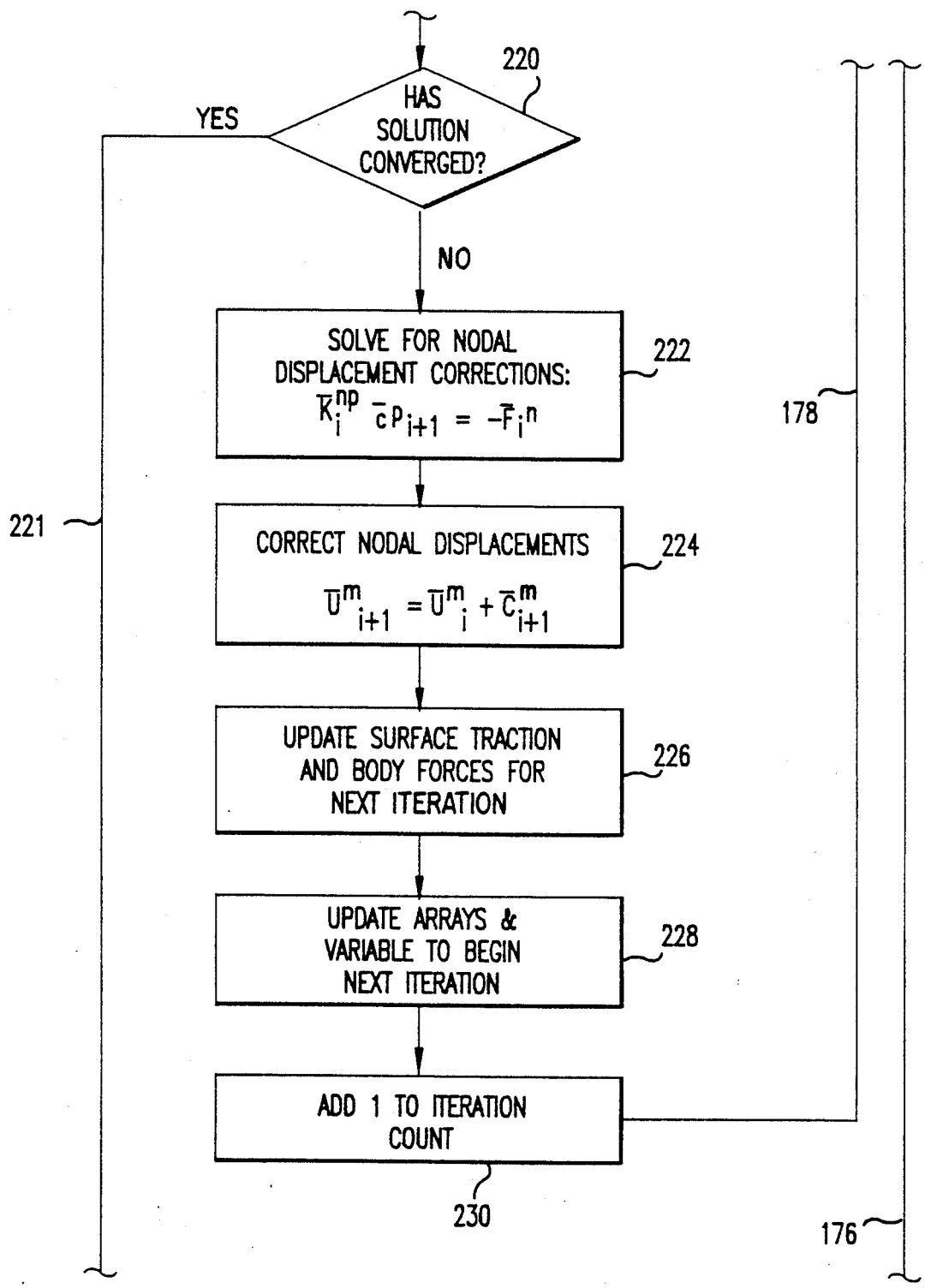

In FIG. 6d, at step 22, the force imbalance at each nodal DOF and the values in the Global Jacobian Matrix are tested to determine if numerical convergence 220 has been achieved. If so, the program solution advances. If not, the program solves for the nodal displacement corrections at 222 and the nodal displacements are updated for the next increment at 224.

As a powder specimen is subjected to the consolidation environment, it will typically experience nonlinear geometric distortion, which is to say it will deform nonuniformly. As a consequence, specimen dimensions will naturally change. The dimensional changes will of course impact surface and area calculations which in turn will alter the applied load, acting on the specimen. The MCCS is designed to take into account this type of nonlinear effect. Accordingly, the applied load conditions, i.e., the surface traction and internal body forces, are updated to reflect the deformed specimen geometry at 226. The global arrays and state variables are also updated at 228, the iteration count is incremented by 1 at 230, and the next iteration cycle is initiated.

Figure 6E:
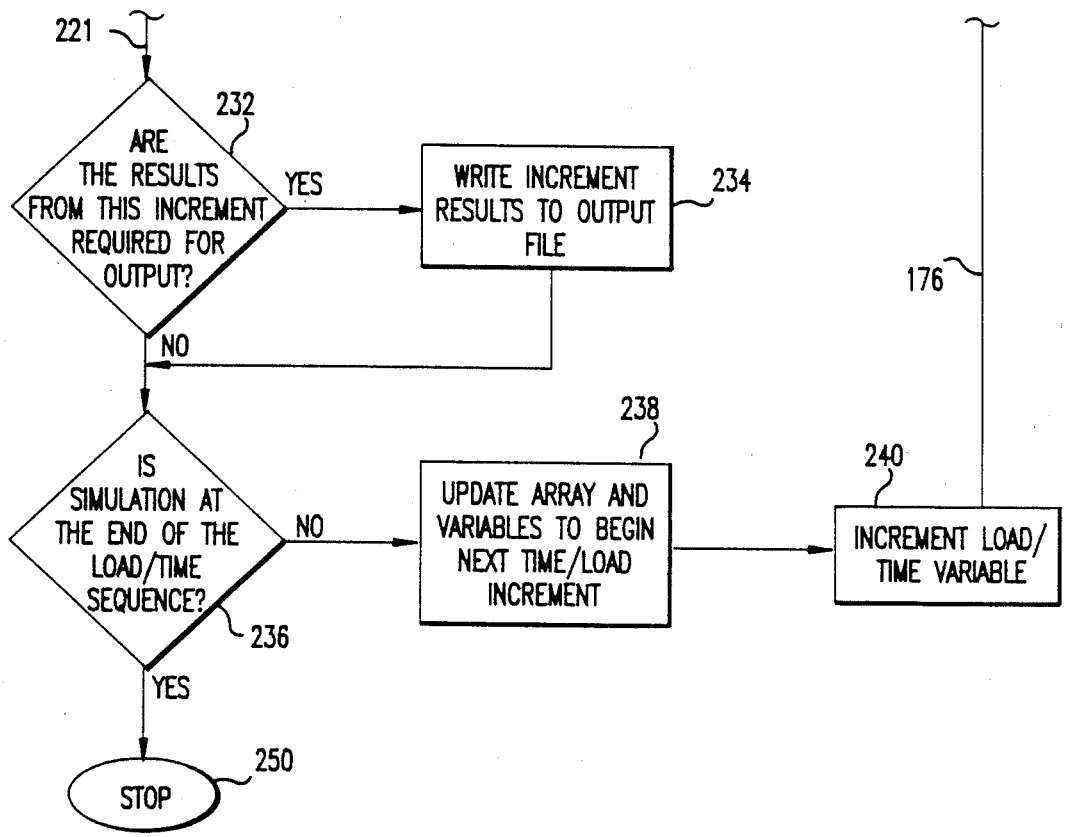

Referring to FIG. 6e, once the solution has converged at 220, the program advances at 221 and the increment results are written to the output files at 234 if the current increment was designated as an output increment in the input file at 232. The load/time variable is checked with respect to the designated maximum load or time specified in the proposed consolidation schedule at 236. If the desired time or load has not been reached, then the global arrays and state variables are updated at 238, the load/time variable is incremented at 240, and the solution progresses to the next load/time increment via main loop 176.

The MCCS Material Subroutine depicted in FIGS. 7, 8a–d determines the stress state for each element in the mesh given the assumed deformation state (strain tensor) and the partial derivative of the stress tensor with respect to the strain tensor (Jacobian). The MCCS Material Subroutine may be applied to powder or particle compacts, porous structures or other forms of partially densified material structures and is formulated to model material behavior under arbitrary thermo-mechanical process schedules. The Material Subroutine is applicable to materials having relative densities which vary from 0.60–1.0. The MCCS Material Subroutine calculates the material stress state attributed to elasticity, plasticity, power-law creep and diffusion mechanisms.

FIG. 7 provides an operational overview of the Material Subroutine incorporated into the FEM System. The subroutine defines the starting point for the integration being conducted on each current element 302. At the starting point, the subroutine assigns state and material parameters to all local variables 304 and then tests to see if the current integration is being conducted on the first time load increment 306. If it is the first time load increment, the subroutine then calculates the initial elastic response to begin the simulation 307. If it is not the first time load increment, the subroutine checks for inelastic response 308 and if there is no inelastic response 309, the subroutine then calculates the elastic response 314. As a follow-up, the Subroutine then calculates the elastic Jacobian 320 and the Subroutine then returns to the main program 330. If however, there is inelastic response, the subroutine first calculates the elastic predictor 310, sets up Newton equations 312, solves the Newton equations 316, and determines a new guess for the inelastic response 318 based on the elastic predictor. After calculating the initial guess for the inelastic response, the Subroutine checks the calculations for convergence 322. If the solution is nonconvergent, the subroutine returns 324 to set up another set of revised Newton equations 312 and the subroutine then calculates a new inelastic response. This loop is repeated until the resulting solution for the current time load increment has converged. Once the solution has reflected convergents, the subroutine then updates the stress and state variables 32 and calculates the Jacobian 328 at which point the subroutine return to the main program.

Figure 8A:
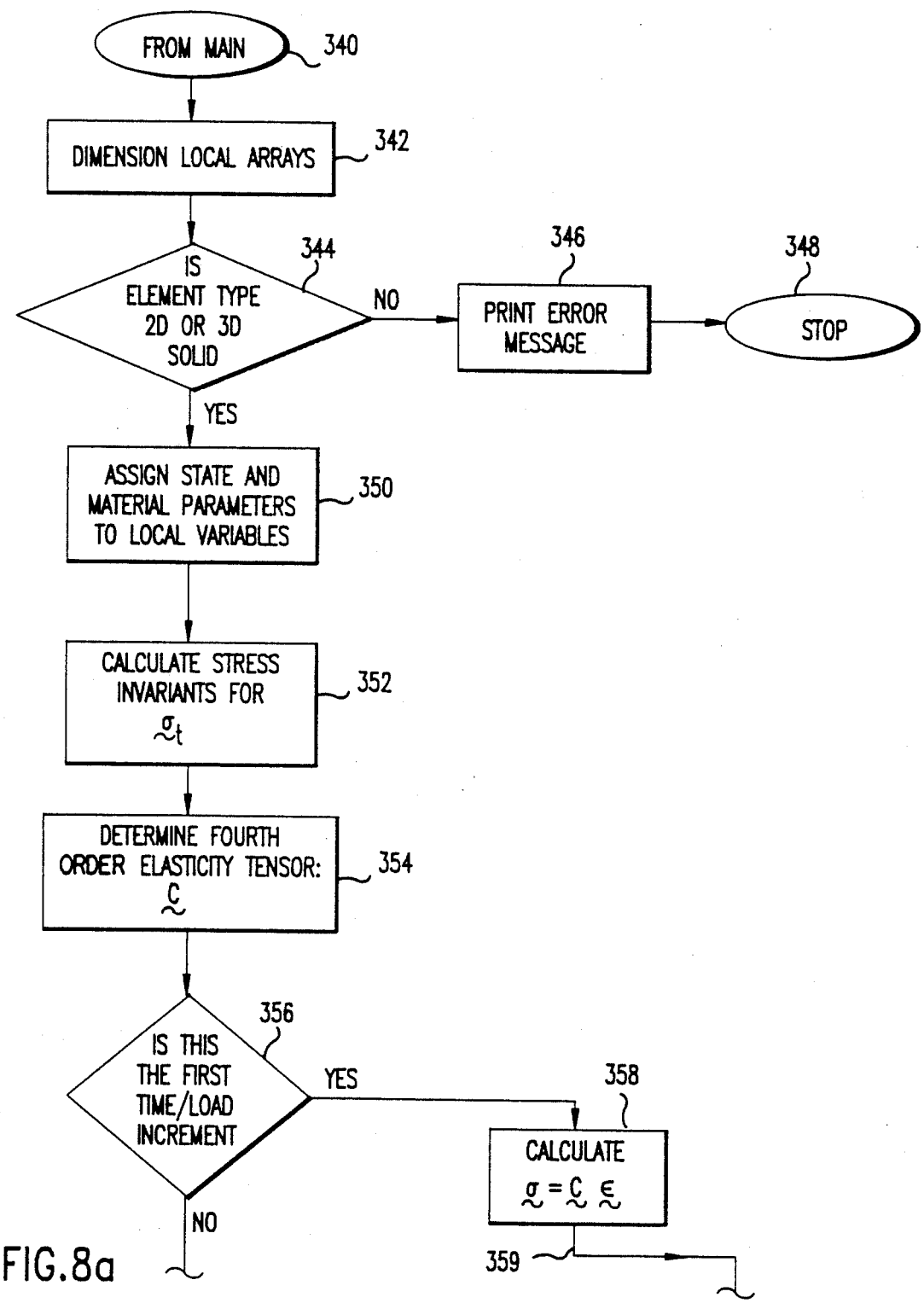
Figure 8C:
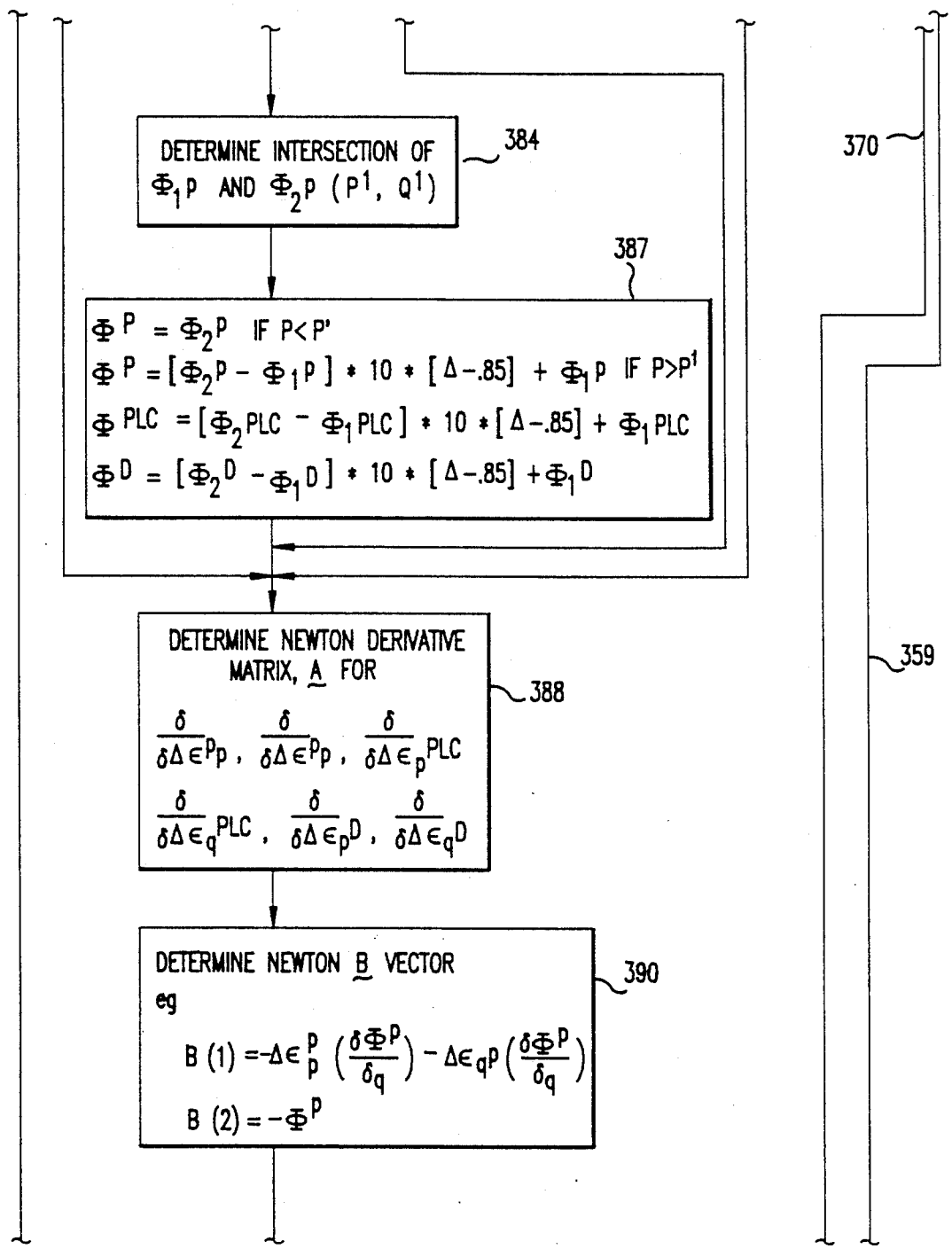
Figure 8D:
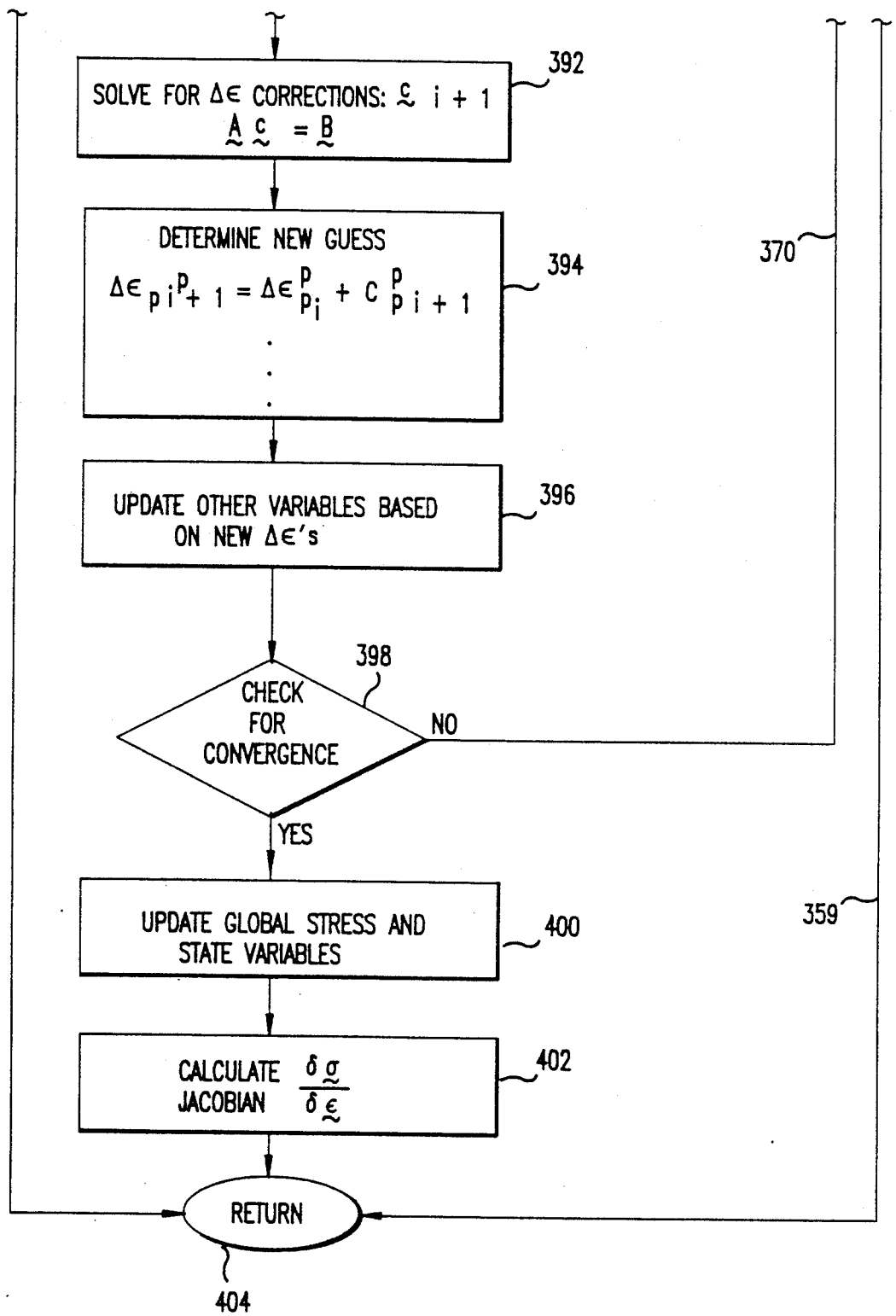

FIG. 8a shows the operational flowchart for the MCCS Material Subroutine. Once the MCCS Material Subroutine has been called by the main FEM program 340, the Material Subroutine dimensions local arrays 342 which are used to formulate a series of Newton loops used in the subroutine. The element type is then checked to determine whether it is a two or three dimensional element 344. The constitutive relationships used in the MCCS Material Subroutine are only valid for solid elements, and cannot be applied to shell type elements of the sort used t define surfaces. If the element type is incorrect, the Material Subroutine prints an error message to the output file 346 and the simulation is concluded at 348. Assuming a proper element type, the Material Subroutine then assigns state and material parameters to the subroutine local variables at 350 as well as the current stress invariants for pressure and deviatoric stress, i.e., equivalent stress at 352.

The next step determines the isotropic fourth order elasticity tensor for the current iteration at 354. The terms in the elasticity tensor are functions of two independent elastic parameters. In this instance, the parameters used are the Modulus of Elasticity and the Shear Modulus. Next, the Subroutine checks to see if this is the first iteration of the first time/load increment at 356. If it is, the Subroutine calculates the elastic response due to the imposed loading conditions at 358 and returns back to the FEM main program at 359. If the simulation has progressed beyond the first iteration of the first time/load increment, then the Material Subroutine checks for inelastic response FIG. 8b, at 360. In this instance the check is made for plasticity, power-law creep, and diffusion. If all these inelastic mechanisms are zero or otherwise insignificant, then the Subroutine calculates the response of the material as being an elastic response at 362, subsequently determines the elastic Jacobian at 364, and then returns to the FEM main program at 359. Where inelastic response is nonexistent or otherwise insignificant, the elastic Jacobian is trivial since it will have the same terms as the fourth order elasticity tensor.

If, however, the inelastic response is determined to be significant, the Material Subroutine calculates the elastic predictor stress tensor which is defined as the double dot product between the fourth order elasticity tensor and the summation of the elastic strain tensor from the previous time/load increment, and the predicted incremental strain for the current increment 366. The Material Subroutine then begins AN INELASTIC RESPONSE LOOP ("IRL"), 370 which is the overall iterative loop determining the inelastic response for each element. The Subroutine predicts the relative density 372 for the current time/load increment by adding to the value calculated for the previous incremental density, and the change in density predicted by the assumed incremental deformation.

During the early stages of the consolidation process typically referred to as Stage I, (relative density less than .9), the powder material is best described as a compact of particulate material. Deformation occurs principally at the contact points of adjoining particles. However, during the latter stages of densification, Stage II (relative density greater than .9), the particles deform over a much larger contact area as the specimen is further transformed from a porous powder compact material structure with reduced void traction and increased density. In this case, deformation occurs around isolated pores rather than against adjacent powder particles.

It should be noted that the material characteristics of a Stage I powder compact versus those of a Stage II porous material are significantly different. Between Stage I and Stage II is a transition zone where the material exhibits features inherent to both particle compacts and the more densified porous material. In order to model the consolidation of powder materials, the constitutive relationships described in this text were developed specifically to model the densification mechanisms (elasticity, plasticity, creep, and diffusion) for the initial particulate compact structure, the transition structure, the partially consolidated porous structures, and fully densified structures.

The text which follows identifies and describes the operation of the constitutive relationships governing plasticity, power-law creep, and diffusion potentials for Stage I and Stage II materials.

To facilitate an understanding of the constitutive equations implemented in the MCCS, the following table of symbols, abbreviations and nomenclature is provided.

TABLE 1
Symbols, Abbreviations & Nomenclature

| | |
|---|---|
| MCCS = | Material Consolidation-Control System |
| DOF = | Degree of Freedom(s) |
| $F^N$ = | Force Imbalance @ Global Equation (DOF) N for ith iteration |
| $U_i^m$ = | Global Nodal Displacement of Global DOF, M, for ith iteration |
| $U_P^P$ = | Global Nodal Displacement of Global DOF, P, |
| $C_{\mu s}$ = | Nodal Displacement Correction for Global DOF, P |
| $\sigma_t$ = | Stress Tensor @ time t |
| C = | Generalized Fourth-Order Elasticity Tensor |
| $\epsilon_a$ = | Strain Tensor |
| $\sigma_e$ = | Elastic Stress Predictor Tensor |
| $\epsilon_t$ = | Elastic Strain Tensor @ time t |
| $\Delta\epsilon_P$ = | Incremental Strain Tensor for time t + t |
| $\phi_P$ = | Plasticity Yield Surface |
| $\phi_{,PLC}$ = | Stage 1 Plasticity Yield Surface |
| $\phi$ = | Power-law Creep Potential |
| $\phi^D$ = | Diffusion Potential |
| $\Delta$ = | Current Relative Density |
| P = | Pressure, Stress Invariant |
| Q = | Deviatorial Stress Invariant |
| $\Delta\epsilon_p^P$ = | Inelastic Dilitational Deformation Due to Plasticity (Incremental) |
| $\Delta\epsilon_q^P$ = | Inelastic Shear Deformation Due to Plasticity (Incremental) |
| $\sigma y$ = | Yield Stress of Matrix |
| $\Delta_o$ = | Initial Packing Density of Sample |
| n = | PLC Exponent |
| $\epsilon_o$ = | PLC Reference Strain Rate |
| $\sigma_o$ = | PLC Reference Stress |
| $\Omega$ = | Weighted Atomic or Molecular Weight |
| K = | Boltzmann's Constraint |
| T = | Absolute Temperature |
| SD = | Grain Boundary Diffusion Coefficient Times the Boundary Thickness |
| R = | Average Particle Radius |
| D = | Lattice Diffusion Coefficient |
| $r^-$ = | pore radius |

The potentials are described in terms of the first and second invariants of the stress tensor, pressure P and deviatoric stress Q respectively. The first equation determines the yield surface for Stage I plasticity in terms of the current relative density and the initial packing density.

$$\Phi_1^P = \frac{Q}{\sigma y} + 1/2 \frac{|P|}{\sigma y} - 3/2 \Delta^2 \left(\frac{\Delta - \Delta o}{1 - \Delta o}\right) = 0$$

The next equation recites the formulation of potential for Stage I power-law creep.

$$\Phi_1^{PLC} = \frac{\epsilon_o \sigma_o}{(n+1)} \left(\frac{\Delta - \Delta o}{1 - \Delta o}\right) \left[\frac{2}{3} \left\{\left(\frac{1 - \Delta o}{\Delta - \Delta o}\right)\frac{Q\sigma}{\sigma_o}\right\}^{n+1} + 3.1\Delta^2 \left(\frac{\Delta - \Delta o}{1 - \Delta o}\right)^{\frac{1}{2}} \left\{\left(\frac{1 - \Delta o}{\Delta - \Delta o}\right)\frac{P}{3\Delta^2 \sigma_o}\right\}^{n+1}\right]$$

Again, the Stage I power-law creep potential is expressed in terms of pressure P, deviatoric stress Q, current relative density, and the initial packing relative density. Also, a power-law creep reference stress, power-law creep reference strain rate, and power-law creep exponent n is required to complete the creep potential description.

$$\Phi_1^D = \frac{7\Omega}{KT\Delta} \left(\frac{1 - \Delta o}{\Delta - \Delta o}\right) \left(\frac{\delta D_B + 3/4 R(\Delta - \Delta o)Dv}{R^3}\right) \left(P^2 + \frac{5\pi}{42} \frac{+(1 - \Delta o) Q^2}{\Delta^2(\Delta - \Delta o)}\right)$$

The equation used to calculate the potential for Stage I diffusion is described in terms of the pressure P, deviatoric stress Q, current relative density, initial packing density, weighted atomic or molecular weight, Boltzmann's constant k, absolute temperature T, the product of the grain boundary diffusion coefficient and the boundary thickness 5, average particle radius R, and the lattice diffusion coefficient D.

The Stage II plasticity equation, which calculates the yield surface, is expressed in terms of P, Q, the matrix yield stress, and the current relative density.

$$\Phi_2^P = \left(\frac{Q}{\sigma y}\right)^2 + 2(1 - \Delta)\cosh\left(\frac{-3P}{2\sigma y}\right) - [1 + (1 - \Delta)^2 = 0$$

It is important to note that when the relative density equals 1.0, this equation simply reduces to the von Mises yield criteria. Likewise, the Stage II equation that describes the power-law creep potential is expressed as a function of P, Q, the current relative density, the power-law creep reference stress, the power-law creep reference strain rate, and the power-law creep exponent. As in the case of the Stage II plasticity equation, the Stage II creep potential also reduces to the standard creep expression for fully densified materials when the relative density equals 1.0.

$$\Phi_2^p = \frac{\sigma_o \epsilon_o}{n+1} \left\{ \Delta \left( \frac{Q}{\Delta \sigma_o} \right)^{n+1} + \right.$$

$$\left. n(1 - \Delta)(1 (1 - \Delta)^{1/n} \left[ \frac{3}{2} \frac{P}{n\sigma_o (1 - (1 - \Delta)^{1/n})} \right]^{n+1} \right\}$$

The Stage II diffusion potential is represented by the equation, $$\Phi_2^D =$$

$$\frac{\Omega}{KTR^3} \left\{ \frac{5\pi}{6} \left( \delta D_B + \frac{2}{\pi} R D_V \right) Q^2 + 2 \left( \delta D_B + 3/4 \, r D_V \, P^2 \right) \right\}$$

The constitutive behavior of the powder material is determined according to the predicted value for the relative density 372. If the density is less than 0.85, 374 then the Material Subroutine determines if the Stage I yield surface at the current relative density intersects the Stage II yield surface at the reference relative density of 0.90, 375. If the Stage I and Stage II yield surfaces do intersect, then the Material Subroutine identifies the location of the intersection point 376 (the intersection point is described by a point in stress space, $P^1$ and $Q^1$). If the current pressure, P, is less than or equal to $P^1$, the Material Subroutine then assigns a value to the plasticity yield surface equal to that for the Stage 2 yield surface at a reference density of 0.90 378. In the alternative, if the current pressure, P, is greater than $P^1$, the Material Subroutine then assigns the plasticity yield surface to be equal to that for Stage I, and assigns values for creep and diffusion potentials equal to the Stage I creep and diffusion potentials 378.

Returning to FIG. 8b, if the Stage I and Stage II plasticity potential do not intersect then the plasticity yield surface, power-law creep potential, and diffusion potential are set equal to the Stage I plasticity yield surface, the Stage I power-law creep potential, and the Stage I diffusion potential, respectively 377. If the relative density is greater than or equal to 0.85, then the subroutine checks to see if the density is greater than 0.95. If the relative density is greater than 0.95, the plasticity yield surface, power-law creep potential, and diffusion potential are set equal to the Stage II plasticity yield surface, Stage II power-law creep potential, and the Stage II diffusion potential, respectively 382. If the relative density is between 0.85 and 0.95, then the subroutine determines the intersection FIG. 8c ($P^1$, $Q^1$) of the Stage I yield surface and the Stage II yield surface 384. If the current pressure, P, is less than or equal to $P^1$ then the plasticity yield surface is equal to the Stage II plasticity yield surface 386. If the current pressure, P, is greater than $P^1$, then the plasticity yield surface is located between the Stage I yield surface and the Stage II yield surface as determined by the density function shown. Similarly, the power-law creep potential and the diffusion potential are also located between their respective Stage I and Stage II expressions as determined by a similar density function 386.

After determining the yield surface and creep and diffusion potential for the current iteration, the Material Subroutine checks to see if plasticity has occurred. This is accomplished by comparing the P and Q values of the elastic stress tensor predictor to its location with respect to the plasticity yield surface. If the elastic stress tensor predictor lies beyond the plasticity yield surface, then plastic yielding has occurred and the solution continues by calculating the incremental dilatational and deviatoric strains due to plasticity. If no plasticity occurs then the incremental plastic dilatational and deviatoric strains are set to zero.

The determination of the plastic incremental strain tensor is based upon a Newton loop. The iterative solution for the plastic incremental strain tensor begins by determining the partial derivatives of the incremental dilatational strain with respect to incremental deviatoric strain. Next, the Newton equations are solved by evaluating the equations shown in 390. The corrections to the predicted incremental plastic dilatational and deviatoric strains are determined 392 and the incremental plastic strain predictors are updated 394.

The solution progresses to the next Newton loop which determines the next stress state predictor in terms of P and Q. The Material Subroutine again calculates the partial derivatives of the equations with respect to P and Q. The P and Q correctors are determined by simultaneously solving these sets of equations 392, 394. P and Q are then updated for the current element, as are the remaining state variables, 396. The solution is then evaluated for convergence, 398. If significant differences between the predicted and corrected values are found, i.e., nonconvergence, then the solution progresses to the next iteration cycle 370. If the solution is found to converge, then the global stress and state variables are updated 400, the partial derivative of the stress tensor with respect to the strain tensor is calculated 402, and the solution returns to the FEM main program 404.

Figure 9:
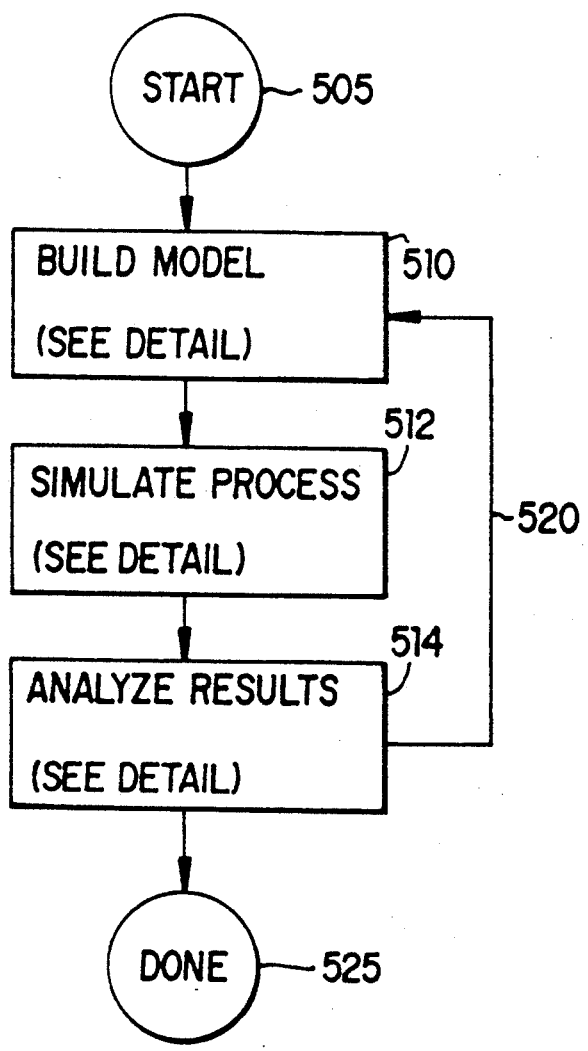
FIG. 9 is a block diagram of the interactive phases of the MCCS user-interface.

The flow of operation for the FEM/CAD user-interface is outlined in FIG. 9. Once activated, 505 the user-interface provides the user with three major system interactive phases, namely, building the model 510, simulating the process 512, and analyzing the results 514. After completing the build-simulate analyze sequence once, the user may choose to alter design system parameters (such as material, process simulation, and/or analysis parameters) and rebuild, resimulate, or reanalyze the consolidation process at will 520.

Figure 10:
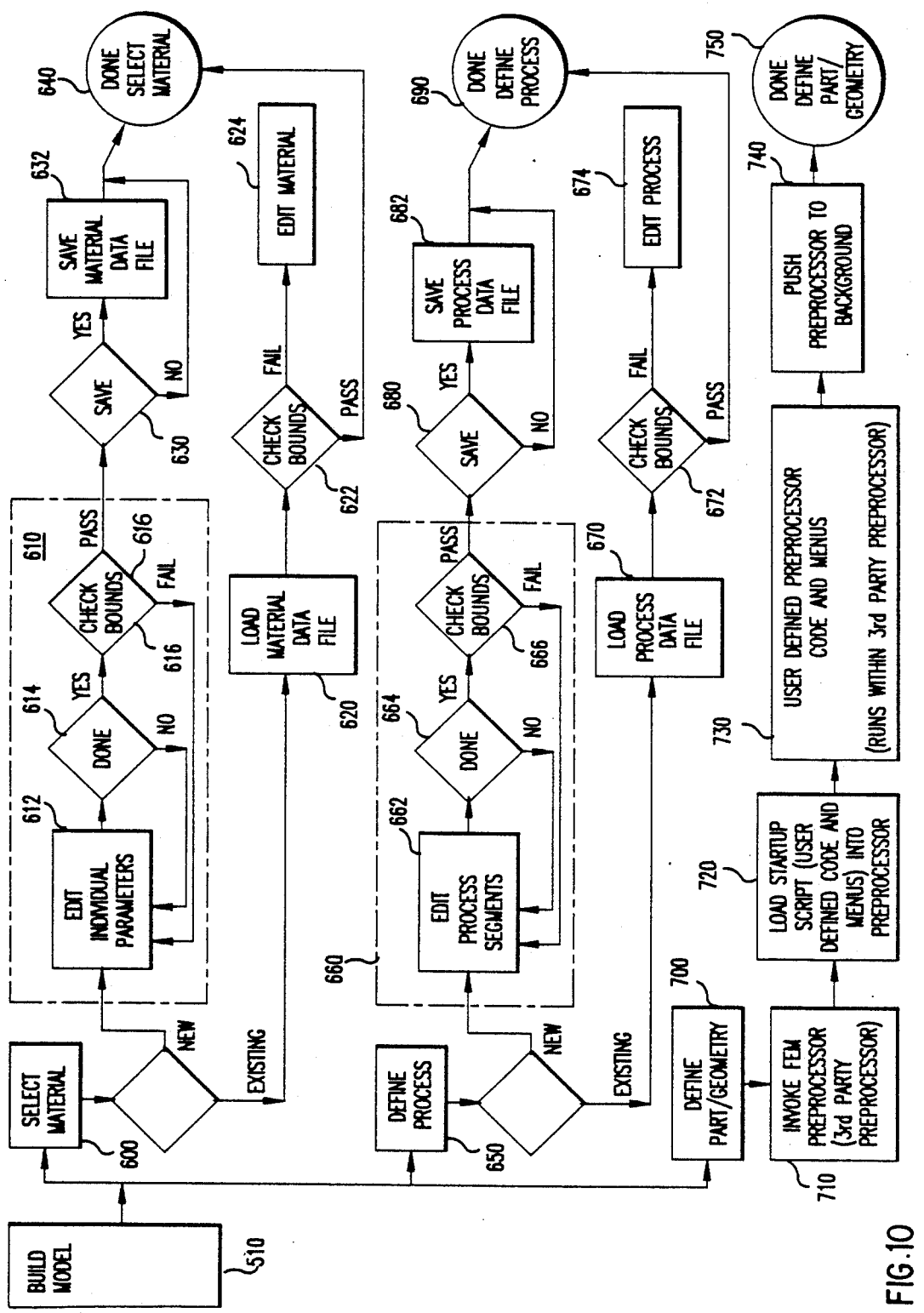
FIG. 10 is a detailed flow diagram of the model building phase of the MCCS user-interface.

The first phase of the process, i.e. building the model, is shown in FIG. 10 has three primary stages, namely material selection 600, process definitization 650 and part geometry 700. The first stage, selecting and characterizing the material, allows the user to either enter specific material parameters (e.g., melting point, reference stresses, etc.) directly into the system 610 or load the requisite data from an existing file 620. Material data for both the material to be consolidated and the encapsulant (if any) may be specified at this time. In the case of either direct input 610 or file retrieval 620, the data are checked by the system for coherence and bounds compliance 616, 622. A failure of the coherence or bound checks results in the user returning to edit the individual parameters in question 612, 624. If the user has elected to directly edit material parameter data, he is asked (upon successful completion of these checks) whether to save these data for future use 632. This concludes the material selection stage.

The second stage of the model building process, definitizing the consolidation process or schedule 650, proceeds along much of the same lines as material selection. During the process definition stage, however, the user specifies an initial process cycle. A process cycle consists of linear temperature and pressure trajectories (specific target values for temperature and pressure over time) together with actuation events (opening and closing valves, turning pumps on and off, etc.). Such a schedule is suitable for controlling the temperature and pressure conditions within the consolidation equipment, i.e. the HIP chamber. As before, the user can either build these data from scratch 660 or load from a previously saved file 670. Bound checks are performed on both the edited and loaded data 666, 672. The user is returned to the process segment editing stage if either check fails 662, 674. Finally in the case of user edited schedule data, the user is asked whether to save the schedule data for later use 682. This concludes the process definitization stage.

The final stage of the model building process is to define the geometry of the part 700. This stage is accomplished through the use of a customized code which typically runs within the commercially available FEM preprocessor 710. From the user's perspective, the FEM preprocessor is loaded by the system 720. Upon invocation, the user is provided with a series of menu-based facilities for building up the part geometry and breaking the part into finite elements (meshing the part) to support FEM computations 730. Upon completion of the customized preprocessor code the preprocessor is relegated to the display background 740, 750. This completes the part/geometry definition stage and the model building phase of MCCS system operation.

Figure 11:
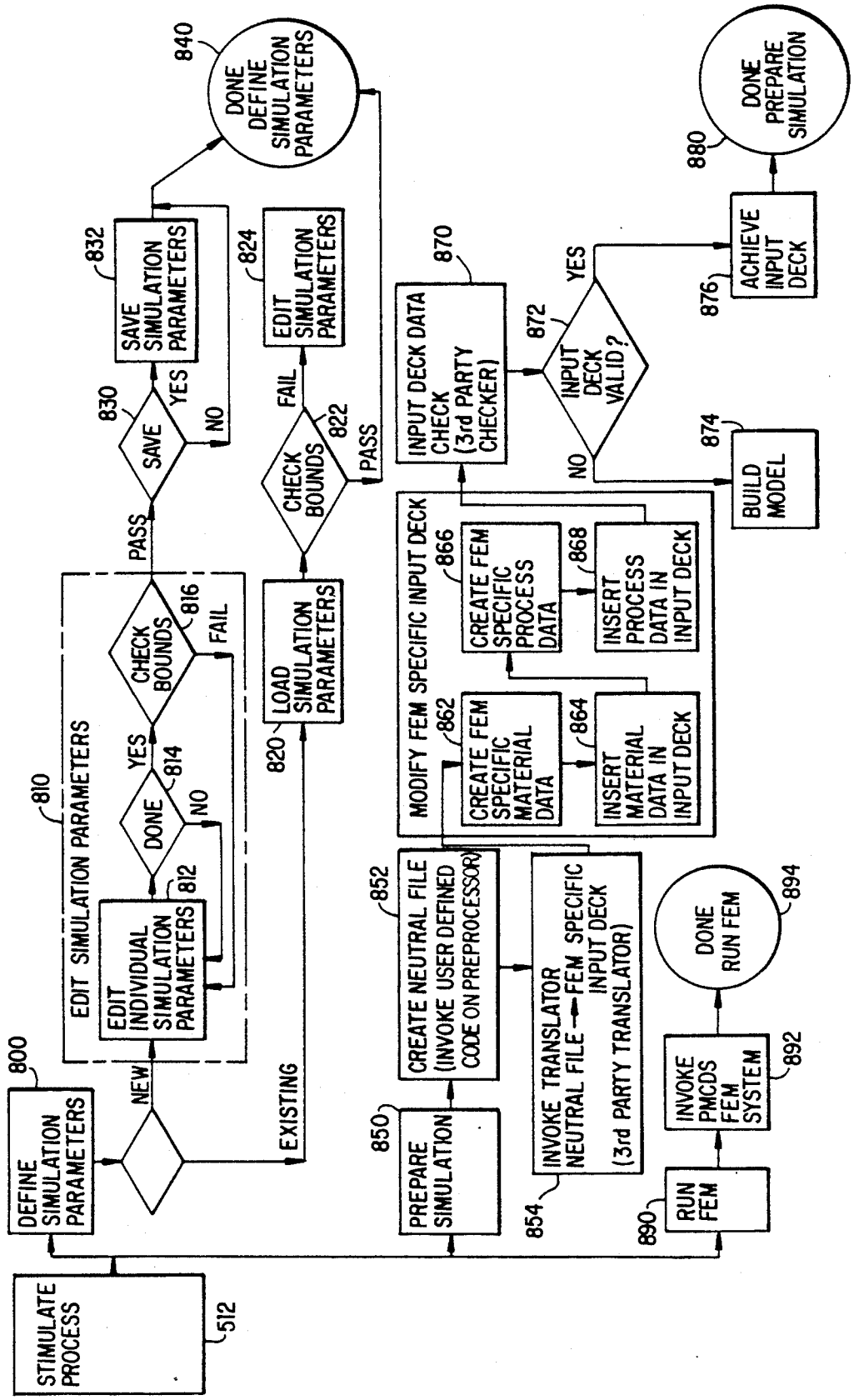
FIG. 11 is a detailed flow diagram of the process simulation phase of the MCCS user-interface.

The second phase of the system's operation is the simulation of process conditions and material consolidation FIG. 11 Within the process simulation phase, there are three primary stages: simulation parameter definition 800, simulation preparation 830, and FEM invocation 890.

The first stage, simulation parameter definition 800, follows the same logic as the material selection and process definition before. At this stage, however, the focus is on defining simulation parameters such as time steps, convergence criteria, and simulation duration. These parameters may either be entered directly by the user 810 or loaded from a previously-saved file 820. Bound checks are performed on the data 816, 822 with the user returning to the editing of parameters upon failure 812, 824. The user is asked whether to save simulation parameters if edits have been made 832. This concludes the simulation parameter definition stage 840.

The second stage is to prepare for simulation execution 850. During this stage the system prepares the specific inputs (known as an input deck) required by the commercially-available FEM code and custom Material Subroutine described earlier. This stage requires little user interaction, because the critical steps are accomplished automatically by the MCCS as follows. First, a neutral (FEM-independent) file is created 852 by running the customized FEM code on the FEM preprocessor as previously described. Second, a translation of the neutral file to an FEM dependent (specific to the FEM code utilized in the MCCS installation) input deck is accomplished by commercially-available code supplied by the preprocessor vendor 854. Third, the MCCS system generates FEM-specific entries in the input deck 860 representing material data entered during Phase 1 862, 864. Fourth, the MCCS system generates FEM-specific entries in the input deck representing the process cycle entered during Phase 1 866, 868. Finally, the resulting input deck is checked using commercially-available software supplied by the FEM vendor 870, 872. Upon successful completion of the data check, the input deck is archived for later reference 876. If the check fails for any reason, the user is returned to the build model phase 874 to make appropriate changes. This conclude the simulation preparation stage 880.

Finally, the third stage in the simulation preparation phase is to invoke the MCCS FEM system 890 using the input deck previously archived 876. The FEM System in turn activates the Material Subroutine previously described in FIGS. 5–8. This concludes the FEM invocation stage and process simulation phases of the MCCS system 894.

Figure 12:
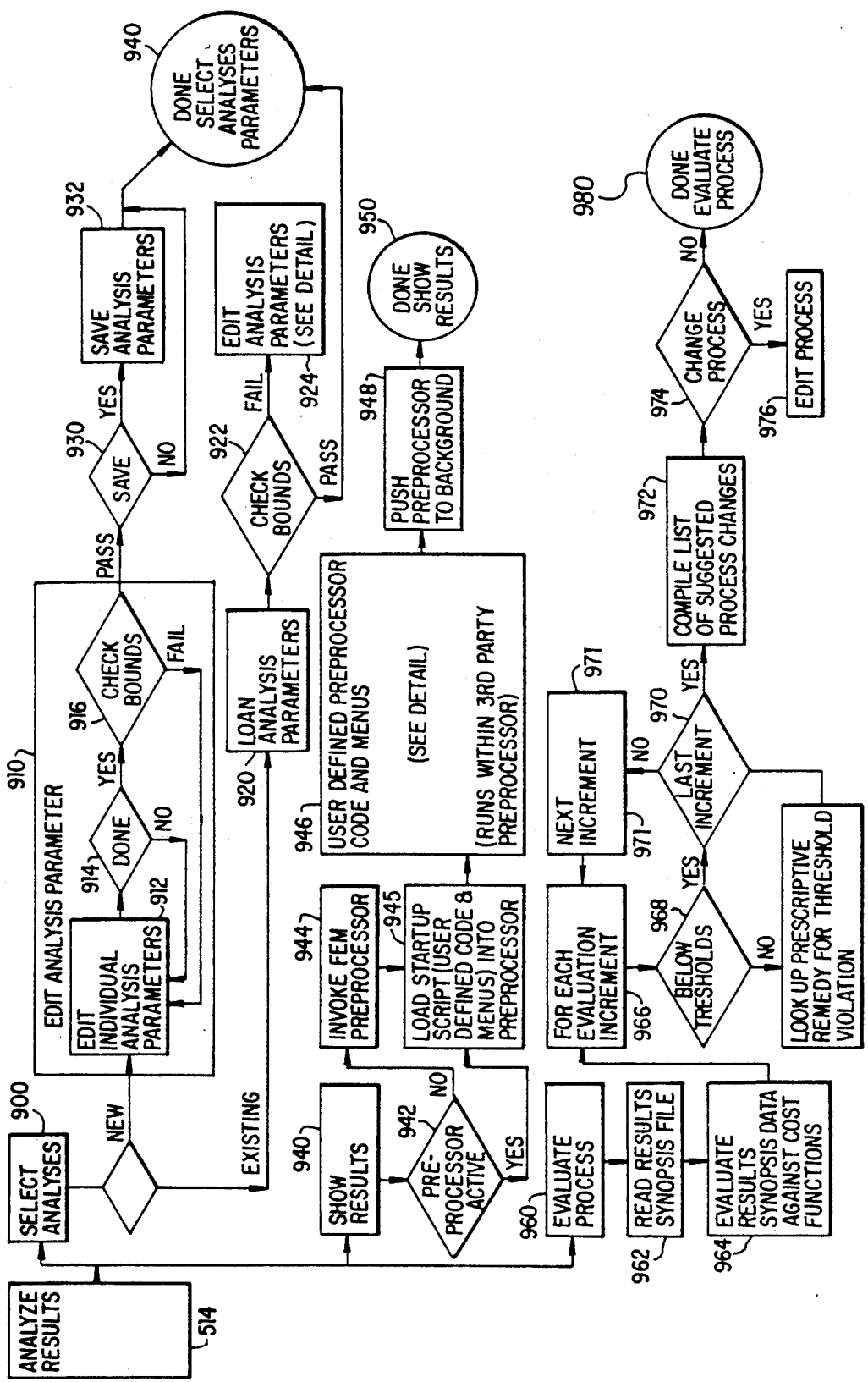
FIG. 12 is a detailed flow diagram of the results analyses phase of the MCCS user-interface.
Figure 13A:
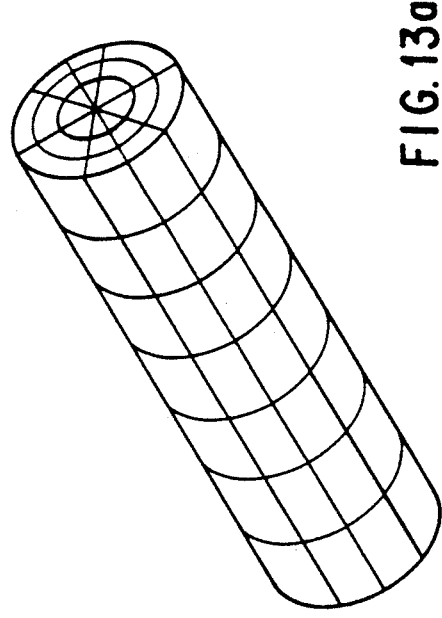
FIGS. 13a–13d are examples of frontal view screen representations of typical input/output visualization modes of the MCCS FEM System.
Figure 13B:
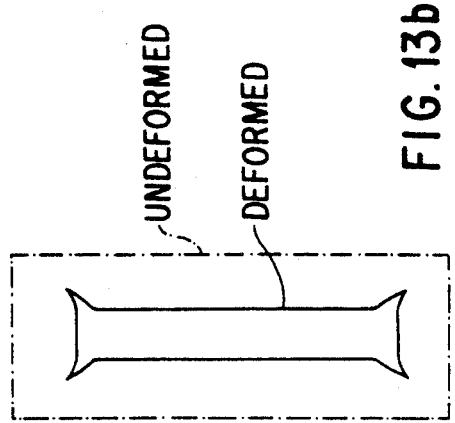
Figure 13C:
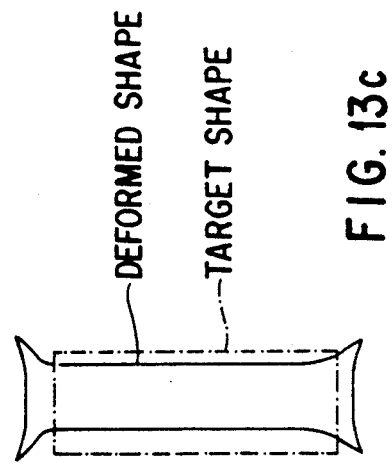
Figure 13D:
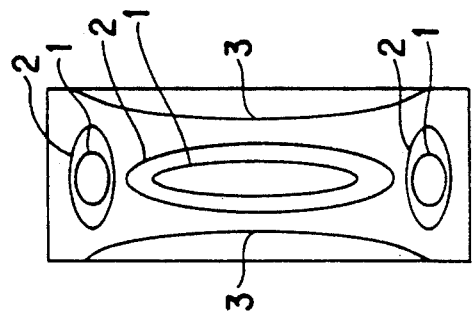

The final phase of operation within the MCCS system is the analysis of simulation results FIG. 12. Within this phase there are three primary stages: analysis selection 900, result depiction 940, and process evaluation 960. Other stages may also be incorporated without deviating from the purpose of the analysis phase.

The first stage, analysis selection, allows the user to specify the particular analyses which may be run during this phase. The primary purpose of this capability is to allow the user to tailor the exact output representation desired thereby skipping unnecessary analyses. The user may also establish the evaluation criteria and thresholds which will be used in the evaluation stage of this phase. For example, a particular user may have a series of steps which he/she routinely runs, so the MCCS system provides the capability to either load the analysis set from a file 920 or define the set from scratch 910. The system checks and ensures that the set of analyses selected are complete and compatible with the FEM System 916, 922. A particular set created or edited by the user may be saved for use again in the future 932. This concludes the analysis definition phase 940.

The second stage of the analysis phase permits the user to prescribe the output format for results from the FEM simulation, and also compiles a results synopsis file for later use. As before, the FEM pre-processor is invoked 942, 944 (or simply brought to the foreground) and a custom start up script (code and menu definitions) is loaded into the pre-processor to guide the user through the output analysis 945. The particular script run is dependent on the analyses selected above.

A series of quantitative summaries of the analytical results depicted within the pre-processor are then compiled into a results synopsis file for use in the next stage 946. Thereafter, the pre-processor is relegated to the background for later use 948.

The final stage is to evaluate the process 960 against a series of criteria, or cost functions. This is accomplished by retrieving the results synopsis file created earlier 962 and evaluating process cost functions or metrics. Typically, these metrics are quantifications of thermal and density gradients over critical cross sections of the part at various stages of the process (i.e., the simulation). Alternatively, these metrics may quantify critical geometric aspects of the part (e.g., radii of curvature, alignment, and shape distortion) throughout the process. For each evaluation increment in time or space, values from the synopsis file are compared to threshold values 966, 968. For example, a user defined threshold for shape distortion in a cylindrical part may require the ratio of length change to radial dimensional change to be between 0.95 and 1.0. If at any point during the simulated process, a threshold is violated 968, the MCCS performs a database lookup to identify a prescriptive remedy 969. Such a remedy may take the form of either a change to processing conditions (i.e., the process control trajectory), preform shape, or encapsulant. The series of prescriptions is compiled by the MCCS system to facilitate changes if the user elects to rebuild the model 972 (i.e., modify the process or redefine the part geometry). The operator may elect to change the process 974, 976, or conclude the evaluation 980.

FIG. 13 illustrates a few of the typical input/output visualizations which may be specified by the user. Among the options available to the user are, visual depiction of the initially configured simulation model in mesh format FIG. 13a; a comparison of the pre- and post-consolidation FEM models showing the extent and characteristics of the resulting distortion pattern FIG. 13b; a comparison of the actual distortion and the simulated distortion of the FEM model FIG. 13c; the density contours predicted within the FEM model FIG. 13d. The user may also visualize thermal gradients, stress-strain states as a function of the consolidation path, as well as the final stress-strain states of the sample following consolidation and cool down. This concludes the process evaluation stage and the analysis of simulation results.

Figure 14:
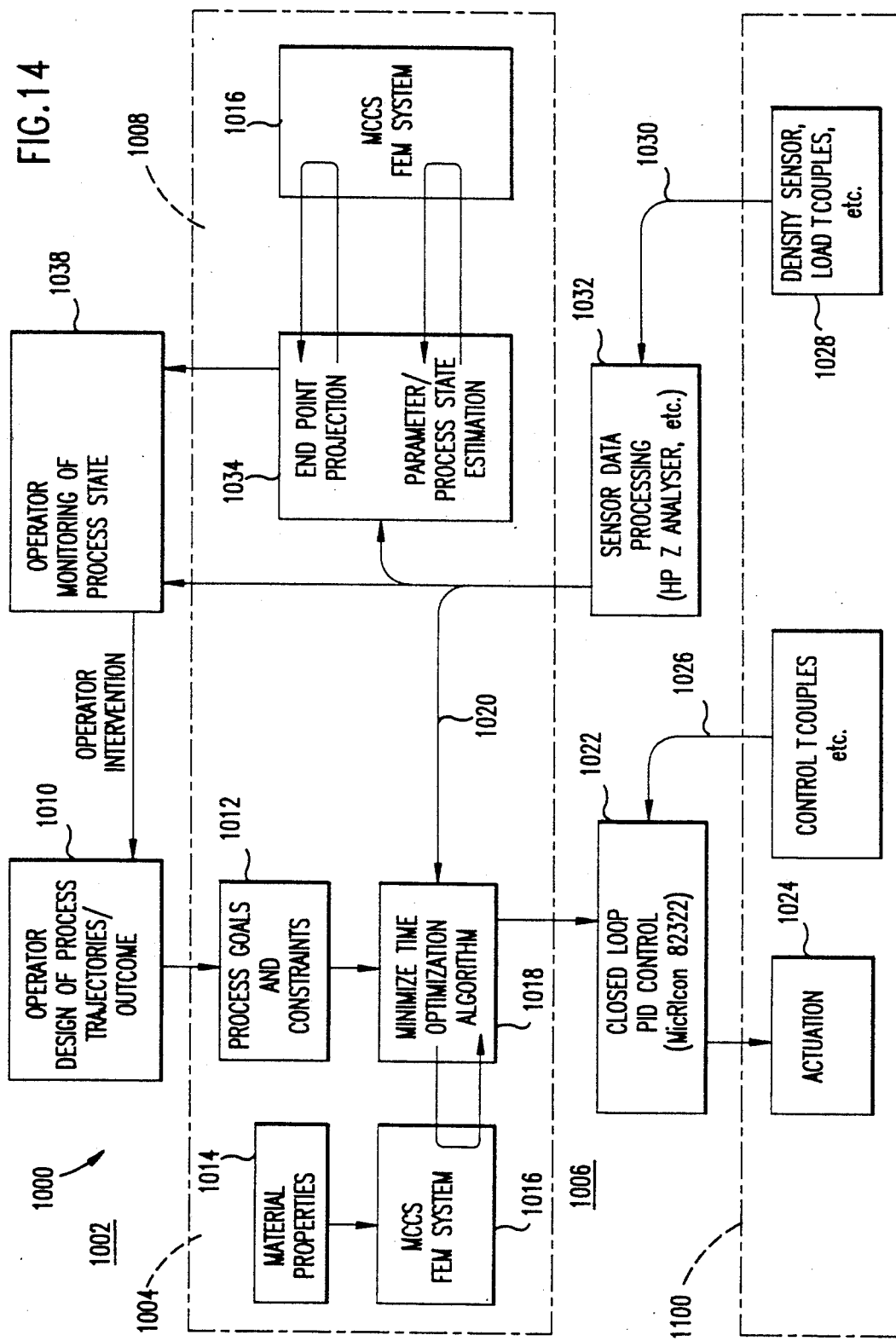
FIG. 14 is an architectural block diagram of the material consolidation control system for HIP.

Referring now to FIG. 14, the material consolidation system for the HIP operational overview is shown in the block diagram. The operational overview illustrates the control algorithm as comprising four levels: the operator intervention level 1002, the process trajectory design level 1004, the process control loop and actuation level 1006 and the process monitoring and analyses level 1008. The functional operations provided on each of these levels is described below. The operator intervention level initiates with an operator involved in the designing of the process trajectories and the desired outcome for the material at step 1010. The process goals and the design constraints are then provided to the MCCS at step 1012. A further input is also provided to the MCCS System concerning the material properties 1014. Such an input may come either from an operator directly, another computer system, or from various sensors that, as previously identified, provide process updates directly related to the material parameters. The MCCS FEM System 1016 then operates on the processing goals and constraints 1012 iteratively to determine the minimal optimization times for the feed forward control. Additional input is provided regarding the current state of the process 1020 in order the up to date PID control and proper sequencing of the feed forward control loop is provided to the controller at step 1022. The PID control, in turn, directly actuates the industrial HIP equipment, or any other process control equipment as may be desired. The PID control operates in a closed loop through feedback provided by control sensors and thermocouples 1026 that form part of the appropriate consolidation equipment. Although the present invention principally describes temperature and pressure and time as the principal feedback parameters, other parameters typically used in material consolidation are envisioned. The HIP equipment, as previously discussed with reference to FIGS. 1a-1c also include a variety of materials sensors of 1028 and transducers which provide feedback signals 1030 to a sensor processor. The sensor processor, in turn, provides signals to the process monitoring and analyses phase 1008 as well as the current state of the process information to the time optimization algorithm 1018. In the process monitoring and analyses phase, the signals are used to calculate the end point projection and the parameter process state estimation at step 1034 in close conjunction with the MCCS FEM System 1016. Projection and process state estimations are then output to the operator via an appropriate display. The operator can intervene at any point in the process to provide outcome determinative calculations as provided previously. As a result, therefore, a dual loop feedback/feedforward control system is provided. Both inner and outer loops are respectively closed-ended. Although the present invention can be provided in an open-ended loop for the material feedforward control while maintaining a closed loop configuration for the PID control.

After considering the recommended altered trajectory and the projected actual trajectory, the operator will select the appropriate trajectory, which will result in a fully densified final structure. The operator then inputs the selected trajectory data into the PID Control 1022 via the MCCS FEM System 1016.

The PID Control 1022 then actuates the HIP environment controls thereby resulting in complete material densification based upon the FEM System projections.

It will be understood that the above description of the present invention is susceptible to various modification, changes and adaptations, and the same are intended to be comprehended within the meaning and range of equivalents of the appended claims.

We claim:

1. An apparatus for controlling the consolidation of material forms, comprising:
   modeling means to stimulate consolidation processes;
   user-interface means for providing the system operator with visual and graphical representations of the output of said modeling means;
   material consolidation control means wherein information provided to said modeling means through said user-interface means provides feedforward control information for said consolidation processes; and
   PID control means for providing feedback control information to control said consolidation processes wherein both said feedforward control and feedback control processing occurs simultaneously.

2. The apparatus of claim 1 wherein said modeling means include:
   relation means for receiving particular parameters for the material and consolidation process and for determining the constitutive relations which govern material behavior.

3. The apparatus of claim 2 wherein said constitutive relations are based on continuum mechanics.

4. The apparatus of claim 2 wherein said constitutive relations govern multiple densification mechanisms including plasticity, power-law creep and diffusion.

5. The apparatus of claim 4 wherein said relation means interrelate the constitutive relations governing the multiple densification mechanisms.

6. The apparatus of claim 5 wherein said relation means interrelate the constitutive relations based upon an estimate of a stage of densification of the material form.

7. The apparatus of claim 6 wherein said stage of densification is one of Stage I an Stage II.

8. The apparatus of claim 6 wherein said stage of densification is one of Stage I, Stage II and a transition between Stage I and Stage II.

9. The apparatus of claim 1 wherein the density of said material forms are in the range of 0.60 to 1.00.

10. The apparatus of claim 1 wherein the modeling means always provides convergent numerical solutions.

11. The apparatus of claim 1 wherein the user-interface means provides visual and graphical representations of one, two and three dimensional outputs.

12. The apparatus of claim 1 wherein the user-interface means provides representations of predicted macroscopic and microscopic shape changes.

13. The apparatus of claim 1 wherein the user-interface means provides representations of predicted physical instabilities of the material form.

14. The apparatus of claim 1 wherein the user-interface means provides representations of predicted effects of container surfaces and parameters on the consolidation of the material form.

15. The apparatus of claim 1 wherein the user-interface means provides representations of predicted densification on macroscope and microscopic bases.

16. The apparatus of claim 1 wherein the user-interface means include modifying means for allowing the user to change particular parameters for the material form and the consolidation process.

17. The apparatus of claim 1 further comprising measurement means for providing empirical parameters for the material form and consolidation process to said modeling means throughout said consolidation process.

18. The apparatus of claim 17 wherein said modeling means simulates said consolidation process based on the empirical parameters received from said measurement means.

* * * * *